(12) United States Patent
Kubota et al.

(10) Patent No.: US 10,545,316 B2
(45) Date of Patent: *Jan. 28, 2020

(54) IMAGING LENS

(71) Applicant: KANTATSU CO., LTD., Tochigi (JP)

(72) Inventors: Yoji Kubota, Nagano (JP); Kenichi Kubota, Tochigi (JP); Hitoshi Hirano, Tochigi (JP); Tomohiro Yonezawa, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,514

(22) Filed: Sep. 17, 2018

(65) Prior Publication Data
US 2019/0041612 A1  Feb. 7, 2019

Related U.S. Application Data

(63) Continuation of application No. 15/361,727, filed on Nov. 28, 2016, now Pat. No. 10,126,526, which is a continuation of application No. 14/988,912, filed on Jan. 6, 2016, now Pat. No. 9,541,738, which is a continuation of application No. 14/551,116, filed on Nov. 24, 2014, now Pat. No. 9,261,673.

(30) Foreign Application Priority Data

Feb. 28, 2014 (JP) .................................. 2014-038093

(51) Int. Cl.
G02B 9/64 (2006.01)
G02B 13/00 (2006.01)
G02B 27/00 (2006.01)

(52) U.S. Cl.
CPC ........... G02B 13/0045 (2013.01); G02B 9/64 (2013.01); G02B 27/0025 (2013.01)

(58) Field of Classification Search
CPC ......... G02B 9/00; G02B 9/64; G02B 13/0045
USPC .......................... 359/708–712, 745, 754, 755
See application file for complete search history.

(56) References Cited

U.S. PATENT DOCUMENTS

| | | | |
|---|---|---|---|
| 4,768,868 A | 9/1988 | Wakamiya | |
| 5,033,832 A | 7/1991 | Ito | |

(Continued)

FOREIGN PATENT DOCUMENTS

| | | | |
|---|---|---|---|
| JP | S58-199312 A | 11/1983 | |
| JP | S58-215620 A | 12/1983 | |

(Continued)

Primary Examiner — Darryl J Collins
(74) Attorney, Agent, or Firm — Kubotera & Associates, LLC

(57) ABSTRACT

An imaging lens includes a first lens having at least one aspheric surface and positive refractive power; a second lens having at least one aspheric surface; a third lens having at least one aspheric surface; a fourth lens having at least one aspheric surface; a fifth lens having at least one aspheric surface; a sixth lens having two aspheric surfaces; and a seventh lens having two aspheric surfaces and negative refractive power, arranged in this order from an object side to an image plane side respectively with a space in between. The imaging lens has a total of seven lenses. The fifth lens is disposed away from the sixth lens by a specific distance on an optical axis. The second lens has a specific Abbe's number.

20 Claims, 18 Drawing Sheets

(56) References Cited

U.S. PATENT DOCUMENTS

| | | | |
|---|---|---|---|
| 5,835,286 A | 11/1998 | Yamanishi | |
| 7,262,922 B2 | 8/2007 | Yamaguchi | |
| 7,715,118 B2 | 5/2010 | Kato | |
| 8,385,002 B2 | 2/2013 | Hsieh | |
| 8,385,008 B2 * | 2/2013 | Hsieh | G02B 13/0045 359/751 |
| 8,599,495 B1 | 12/2013 | Tsai et al. | |
| 9,116,329 B2 | 8/2015 | Fukaya | |
| 9,541,738 B2 * | 1/2017 | Kubota | G02B 13/0045 |
| 2013/0050846 A1 | 2/2013 | Huang | |
| 2014/0139931 A1 | 5/2014 | Kubota | |
| 2014/0184887 A1 | 7/2014 | Yonetani et al. | |
| 2014/0211324 A1 | 7/2014 | Ishizaka | |
| 2014/0313395 A1 | 10/2014 | Lee | |
| 2014/0376105 A1 | 12/2014 | Sekine | |
| 2015/0009578 A1 | 1/2015 | Shinohara et al. | |
| 2015/0103414 A1 | 4/2015 | Baik | |
| 2015/0198787 A1 | 7/2015 | Kubota et al. | |
| 2015/0198791 A1 | 7/2015 | Kubota et al. | |
| 2015/0212298 A1 | 7/2015 | Shinohara et al. | |

FOREIGN PATENT DOCUMENTS

| | | |
|---|---|---|
| JP | 2012-155223 A | 8/2012 |
| JP | 2015-072403 A | 4/2015 |

\* cited by examiner

IMAGING LENS

CROSS-REFERENCE TO RELATED APPLICATIONS

This is a continuation application of a prior application Ser. No. 15/361,727, filed on Nov. 28, 2016, allowed, which is a continuation application of a prior application Ser. No. 14/988,912, filed on Jan. 6, 2016, issued as U.S. Pat. No. 9,541,738 on Jan. 10, 2017, which is a continuation application of a prior application Ser. No. 14/551,116, filed on Nov. 24, 2014, issued as U.S. Pat. No. 9,261,673 on Feb. 16, 2016.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., cellular phones with functions of portable information terminals (PDAs) and/or personal computers, have been more widely used. Since the smartphones generally are highly functional as opposed to the cellular phones, it is possible to use images taken by a camera thereof in various applications.

Generally speaking, product groups of cellular phones and smartphones are often composed according to specifications for beginners to advanced users. Among them, an imaging lens to be mounted in a product designed for advanced users is required to have a high resolution lens configuration so as to be also applicable to a high pixel count imaging element of these years.

As a method of attaining a high-resolution imaging lens, there is a method of increasing the number of lenses that compose the imaging lens. However, the increase of the number of lenses easily causes increase of the size of the imaging lens. Therefore, the lens configuration having a large number of lenses is disadvantageous for mounting in a small-sized camera such as the above-described cellular phones and smartphones. For this reason, an imaging lens has been developed so as to restrain the number of lenses as small as possible. However, with rapid advancement in achieving higher pixel count of an imaging element in these days, an imaging lens has been developed so as to attain higher resolution rather than attaining shorter total track length of the imaging lens. As an example, there is an advent of a camera unit formed to be able to obtain an image that is equivalent to that obtained by a digital still camera by attaching the camera unit to a cellular phone or a smartphone, which is different from a conventional camera unit containing an imaging lens and an imaging element to be mounted inside of a cellular phone or a smartphone.

In case of a lens configuration composed of seven lenses, since the number of lenses that compose an imaging lens is many, it is somewhat disadvantageous for downsizing of the imaging lens. However, since there is high flexibility in designing, it has potential of attaining satisfactory correction of aberrations and downsizing in a balanced manner. For example, as an imaging lens having a seven-lens configuration as described above, an imaging lens described in Patent Reference is known.

Patent Reference: Japanese Patent Application Publication No. 2012-155223

The imaging lens described in Patent Reference includes a first lens having a biconvex shape, a second lens that is joined to the first lens and has a biconcave shape, a third lens that is negative and has a shape of a meniscus lens directing a convex surface thereof to an object side, a fourth lens that is positive and has a shape of a meniscus lens directing a concave surface thereof to the object side, a fifth lens that is negative and has a shape of a meniscus lens directing a convex surface thereof to the object side, a sixth lens having a biconvex shape, and a seventh lens having a biconcave shape, arranged in the order from the object side. According to the imaging lens of Patent Reference, by restraining a ratio between a focal length of a first lens group composed of the first lens to the fourth lens and a focal length of a second lens group composed of the fifth lens to the seventh lens within a certain range, it is possible to attain downsizing of the imaging lens and satisfactory correction of aberrations.

The imaging lens described in Patent Reference is small-sized, but aberrations on an image plane are not sufficiently corrected and especially distortion is relatively large. Therefore, there is a limit by itself in achieving a high-resolution imaging lens. According to the lens configuration of Patent Reference, it is difficult to attain satisfactory correction of aberrations while downsizing the imaging lens.

Here, such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain downsizing thereof and satisfactory aberration correction.

Further objects and advantages of the present invention will be apparent from the following description of the invention.

SUMMARY OF THE INVENTION

In order to attain the objects described above, according to a first aspect of the present invention, an imaging lens includes a first lens group having positive refractive power; a second lens group having positive refractive power; and a third lens group having negative refractive power, arranged in the order from an object side to an image plane side. The first lens group includes a first lens having positive refractive power, a second lens having negative refractive power, and a third lens having positive refractive power. The second lens group includes a fourth lens having positive refractive power and a fifth lens having positive refractive power. The third lens group includes a sixth lens and a seventh lens.

According to the first aspect of the present invention, when the first lens has an Abbe's number $vd1$, the second lens has an Abbe's number $vd2$, the third lens has an Abbe's number $vd3$, the fourth lens has an Abbe's number $vd4$, and the fifth lens has an Abbe's number $vd5$, the imaging lens of the present invention satisfies the following conditional expressions (1) to (5):

$$40 < vd1 < 75 \tag{1}$$

$$20 < vd2 < 35 \tag{2}$$

$$40 < vd3 < 75 \tag{3}$$

$$40<vd4<75 \quad (4)$$

$$20<vd5<35 \quad (5)$$

According to the first aspect of the present invention, the imaging lens includes the first lens group having positive refractive power, the second lens group having positive refractive power, and the third lens group having negative refractive power, arranged in the order from the object side. The refractive powers of the respective lens groups are arranged in the order of "positive-positive-negative" from the object side. Generally speaking, a chromatic aberration is corrected by a combination of a lens group having positive refractive power and a lens group having negative refractive power, arranged in the order from the object side. According to the lens configuration, in order to attain downsizing of the imaging lens, it is necessary to increase the refractive power of the positive lens group arranged on the object side. However, when the lens group having positive refractive power has strong refractive power, it is often difficult to satisfactorily correct a chromatic aberration.

According to the first aspect of the present invention, in the imaging lens, the positive refractive power of the whole lens system is shared between the first lens group and the second lens group. Therefore, in comparison with a case where there is only one lens group that has positive refractive power, the refractive powers of the positive lenses that compose the respective lens groups are kept relatively weak. Therefore, according to the imaging lens of the present invention, it is possible to satisfactorily correct aberrations, especially the chromatic aberration. In addition, it is also possible to obtain satisfactory image-forming performance that is necessary for high-resolution imaging lens. Moreover, according to the imaging lens of the present invention, since the third lens group has negative refractive power, it is possible to suitably attain downsizing of the imaging lens.

The first lens group includes three lenses, such that the refractive powers of those lenses are arranged in the order of positive-negative-positive. Those three lenses are respectively made from lens materials that satisfy the conditional expressions (1) to (3). With the arrangement of the refractive powers and the order of the Abbe's numbers of the respective lenses, it is possible to suitably restrain generation of chromatic aberration in the first lens group and also satisfactorily correct the chromatic aberration if generated.

Furthermore, according to the first aspect of the present invention, in the imaging lens, the second lens group includes two positive lenses and is composed of a combination of a lens made of a high-dispersion material and a lens made of a low-dispersion material so as to satisfy the conditional expressions (4) and (5). Therefore, it is possible to further satisfactorily correct aberrations generated in the first lens group, especially chromatic aberration.

Generally speaking, in order to attain high-resolution imaging lens, it is necessary to satisfactorily correct aberrations, especially chromatic aberration. According to the imaging lens of the present invention, with the arrangement of the refractive powers of the respective lens groups of the first lens group to the third lens group, the arrangement of the refractive powers and the order of the Abbe's numbers of the three lenses that compose the first lens group, and the order of the Abbe's numbers of the two positive lenses that compose the second lens group, it is possible to more satisfactorily correct the chromatic aberration than a conventional imaging lens.

According to a second aspect of the present invention, the sixth lens and the seventh lens have both a negative refractive power. When the sixth lens has an Abbe's number vd6 and the seventh lens has an Abbe's number vd7, the imaging lens having the above-described configuration preferably satisfies the following conditional expressions (6) and (7):

$$20<vd6<35 \quad (6)$$

$$40<vd7<75 \quad (7)$$

According to the second aspect of the present invention, in the imaging lens, the third lens group includes two negative lenses and is composed of a combination of a lens made of a low-dispersion material and a lens made of a high-dispersion material so as to satisfy the conditional expressions (6) and (7). Therefore, it is possible to more satisfactorily correct aberrations, especially the chromatic aberration, generated in the first lens group and the second lens group.

According to a third aspect of the present invention, when the first lens has a focal length f1 and the third lens has a focal length f3, the imaging lens having the above-described configuration preferably satisfies the following conditional expression (8):

$$0.3<f3/f1<3.0 \quad (8)$$

When the imaging lens satisfies the conditional expression (8), it is achievable to satisfactorily correct astigmatism and a field curvature, while attaining a small size of the imaging lens. When the value exceeds the upper limit of "3.0", the third lens has weak positive refractive power in the first lens group. Therefore, in order to correct aberrations, it is necessary to increase the positive refractive power of the first lens that has positive refractive power similarly to the third lens.

In this case, although it is advantageous for downsizing of the imaging lens, a back focal length is short, so that it is difficult to secure space to dispose an insert such as an infrared cutoff filter. Moreover, in the astigmatism, a sagittal image surface tilts toward a side of an image plane (a plus side). Therefore, the periphery of the image curves to a side of the image plane, and it is difficult to obtain satisfactory imaging performance. On the other hand, when the value is below the lower limit of "0.3", although it is advantageous for securing the back focal length, it is difficult to downsize the imaging lens.

In addition, a tangential image surface curves to the object side (a minus side) at the periphery of the image. Therefore, an astigmatic difference increases and also in this case, it is difficult to obtain satisfactory image-forming performance.

According to a fourth aspect of the present invention, when the second lens has a focal length f2 and the third lens has a focal length f3, the imaging lens having the above-described configuration preferably satisfies the following conditional expression (9):

$$-3.0<f2/f3<-0.3 \quad (9)$$

When the imaging lens satisfies the conditional expression (9), it is achievable to restrain the chromatic aberration, the field curvature, and the astigmatism within respective preferred ranges in a balanced manner, while downsizing the imaging lens. When the value exceeds the upper limit of "−0.3", the second lens has strong negative refractive power relative to the positive refractive power of the third lens. Therefore, although it is advantageous for securing the back focal length and correcting an axial chromatic aberration, it is difficult to downsize the imaging lens.

In addition, an image-forming surface curves to the image plane side at the periphery of the image, so that the field curvature is excessively corrected and the astigmatic difference increases. Therefore, it is difficult to obtain satisfactory image-forming performance. On the other hand, when the value is below the lower limit of "−3.0", although it is advantageous for downsizing of the imaging lens, it is difficult to secure the back focal length. Moreover, the astigmatic difference increases, and the image-forming surface curves to the object side at the periphery of the image and the field curvature is insufficiently corrected.

In addition, the axial chromatic aberration and a chromatic aberration of magnification also respectively increase. Therefore, also in this case, it is difficult to obtain satisfactory image-forming performance.

According to a fifth aspect of the present invention, when the whole lens system has a focal length f and the fourth lens has a focal length f4, the imaging lens having the above-described configuration preferably satisfies the following conditional expression (10):

$$4.5 < f4/f < 9.0 \qquad (10)$$

When the imaging lens satisfies the conditional expression (10), it is achievable to restrain the curving of the image-forming surface while satisfactorily correcting the axial chromatic aberration. When the value exceeds the upper limit of "9.0", the fourth lens has weak positive refractive power relative to the refractive power of the whole lens system. As a result, it is easier to correct the axial chromatic aberration. However, since the tangential image surface curves at the periphery of the image, it is difficult to restrain the curving of the image-forming surface. On the other hand, when the value is below the lower limit of "4.5", the fourth lens has strong positive refractive power relative to the refractive power of the whole lens system.

Therefore, the focal length of the whole lens system is short, and it is difficult to secure the back focal length. Here, when the fourth lens has strong refractive power like this, if the refractive power of another lens having positive refractive power is weakened or the refractive power of other lens having negative refractive power is increased so as to restrain shortening of the focal length, the astigmatic difference increases. Therefore, it is difficult to restrain the curving of the image-forming surface.

According to a sixth aspect of the present invention, when the whole lens system has a focal length f and a composite focal length of the fourth lens and the fifth lens is f45, the imaging lens having the above-described configuration preferably satisfies the following conditional expression (11):

$$1.5 < f45/f < 5.0 \qquad (11)$$

When the imaging lens satisfies the conditional expression (11), it is achievable to satisfactorily correct the field curvature and the astigmatism, while downsizing the imaging lens. When the value exceeds the upper limit of "5.0", the second lens group has weak positive refractive power relative to the refractive power of the whole lens system. Therefore, in order to correct aberrations, it is necessary to increase the positive refractive power of the first lens group. As a result, although it is advantageous for correcting the astigmatism and for downsizing of the imaging lens, it is difficult to secure the back focal length.

Moreover, since the image-forming surface curves to the image plane side, it is difficult to obtain satisfactory image-forming performance. Here, when trying to correct the aberrations by weakening the negative refractive power of the third lens group for the weakening of the positive refractive power of the second lens group, although it is advantageous for correcting the chromatic aberration of magnification, the astigmatic difference increases. Therefore, it is difficult to obtain satisfactory image-forming performance. On the other hand, when the value is below the lower limit of "1.5", the second lens group has strong positive refractive power relative to the refractive power of the whole lens system. Therefore, the astigmatic difference increases, and it is difficult to obtain satisfactory image-forming performance.

According to a seventh aspect of the present invention, when a composite focal length of the fourth lens and the fifth lens is f45 and a composite focal length of the sixth lens and the seventh lens is f67, the imaging lens having the above-described configuration preferably satisfies the following conditional expression (12):

$$-6.0 < f45/f67 < -1.5 \qquad (12)$$

When the imaging lens satisfies the conditional expression (12), it is possible to satisfactorily correct the chromatic aberration and the astigmatism, while downsizing the imaging lens. Moreover, when the imaging lens satisfies the conditional expression (12), it is also possible to restrain an incident angle of a light beam emitted from the imaging lens to an image plane of an imaging element. As is well known, an imaging element such as a CCD sensor or a CMOS sensor has a so-called chief ray angle (CRA) set in advance, i.e. a range of an incident angle of a light beam that can be taken in the sensor. By restraining the incident angle of a light beam emitted from the imaging lens to the image plane within the range of CRA, it is possible to suitably restrain generation of shading, which is a phenomenon of becoming dark on the image periphery.

When the value exceeds the upper limit of "−1.5" in the conditional expression (12), it is easy to restrain the incident angle of a light beam emitted from the imaging lens to the image plane within the range of CRA, and it is also easy to secure the back focal length. However, at the same time, it is difficult to downsize the imaging lens. Moreover, in the astigmatism, the sagittal image surface curves to the image plane side, so that it is difficult to obtain satisfactory image-forming performance. On the other hand, when the value is below the lower limit of "−6.0", although it is advantageous for downsizing of the imaging lens, it is difficult to secure the back focal length. In addition, it is also difficult to restrain the incident angle of a light beam emitted from the imaging lens to the image plane within the range of CRA. Moreover, in the astigmatism, the tangential image surface curves to the object side. Therefore, the astigmatic difference increases, and it is difficult to obtain satisfactory image-forming performance.

According to an eighth aspect of the present invention, when the whole lens system has a focal length f and a distance on the optical axis between the third lens and the fourth lens is D34, the imaging lens having the above-described configuration preferably satisfies the following conditional expression (13):

$$0.05 < D34/f < 0.3 \qquad (13)$$

When the imaging lens satisfies the conditional expression (13), it is possible to satisfactorily correct the astigmatism and the distortion, while restraining the incident angle of a light beam emitted from the imaging lens to the image plane of the imaging element within the range of CRA. When the value exceeds the upper limit of "0.3", it is difficult to restrain the incident angle of a light beam emitted from the imaging lens to the image plane within the range of CRA. Moreover, in the astigmatism, the sagittal image surface curves to the image plane side. Therefore, the astigmatic difference increases, and the field curvature is excessively corrected. For this reason, it is difficult to obtain satisfactory image-forming performance.

On the other hand, when the value is below the lower limit of "0.05", although it is easy to restrain the incident angle of a light beam emitted from the imaging lens to the image plane within the range of CRA, a minus distortion increases. Moreover, in the astigmatism, the sagittal image surface curves to the object side. Also in this case, it is difficult to obtain satisfactory image-forming performance.

According to a ninth aspect of the present invention, when the whole lens system has a focal length f and a distance on the optical axis between the fifth lens and the sixth lens is D56, the imaging lens having the above-described configuration preferably satisfies the following conditional expression (14):

$$0.05 < D56/f < 0.25 \tag{14}$$

When the imaging lens satisfies the conditional expression (14), it is possible to satisfactorily correct the chromatic aberration and the distortion, while restraining the incident angle of a light beam emitted from the imaging lens to the image plane of the imaging element within the range of CRA. When the value exceeds the upper limit of "0.25", a plus distortion increases and a chromatic aberration of magnification increases at the periphery of the image, so that it is difficult to obtain satisfactory image-forming performance. Moreover, in this case, it is difficult to secure the back focal length, and it is difficult to restrain the incident angle of a light beam emitted from the imaging lens to the image plane of the imaging element within the range of CRA. On the other hand, when the value is below the lower limit of "0.05", it is easy to secure the back focal length and it is easy to restrain the incident angle of a light beam emitted from the imaging lens to the image plane of the imaging element within the range of CRA. However, a minus distortion increases, so that it is difficult to obtain satisfactory image-forming performance.

According to a tenth aspect of the present invention, when the whole lens system has a focal length f and the seventh lens has a focal length f7, the imaging lens having the above-described configuration preferably satisfies the following conditional expression (15):

$$-4.0 < f7/f < -1.0 \tag{15}$$

When the imaging lens satisfies the conditional expression (15), it is possible to restrain the field curvature, the astigmatism, and the chromatic aberration within respective preferable ranges in a balanced manner. When the value exceeds the upper limit of "−1.0", the seventh lens has strong negative refractive power relative to the refractive power of the whole lens system. Therefore, the astigmatic difference increases and the image-forming surface curves to the image plane side, so that the field curvature is excessively corrected. In addition, the chromatic aberration of magnification increases at the image periphery, so that it is difficult to obtain satisfactory image performance.

On the other hand, when the value is below the lower limit of "−4.0", the seventh lens has weak negative refractive power relative to the refractive power of the whole lens system. Therefore, the axial chromatic aberration is insufficiently corrected (a focal position at a short wavelength moves to the object side relative to a focal position at a reference wavelength), and it is difficult to obtain satisfactory image-forming performance. In this case, it is also difficult to correct the astigmatism.

According to the imaging lens having the above-described configuration, the sixth lens and the seventh lens are preferably formed as aspheric shapes such that their positive refractive powers become stronger from the optical axis toward the lens peripheries.

The sixth lens and the seventh lens, which compose the third lens group, are formed as aspheric shapes such that the positive refractive powers become stronger from the optical axis toward the lens peripheries. As a result, it is possible to satisfactorily correct not only the axial chromatic aberration, but also the off-axis chromatic aberration of magnification. In addition, it is also possible to suitably restrain the incident angle of a light beam emitted from the imaging lens to the image plane.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
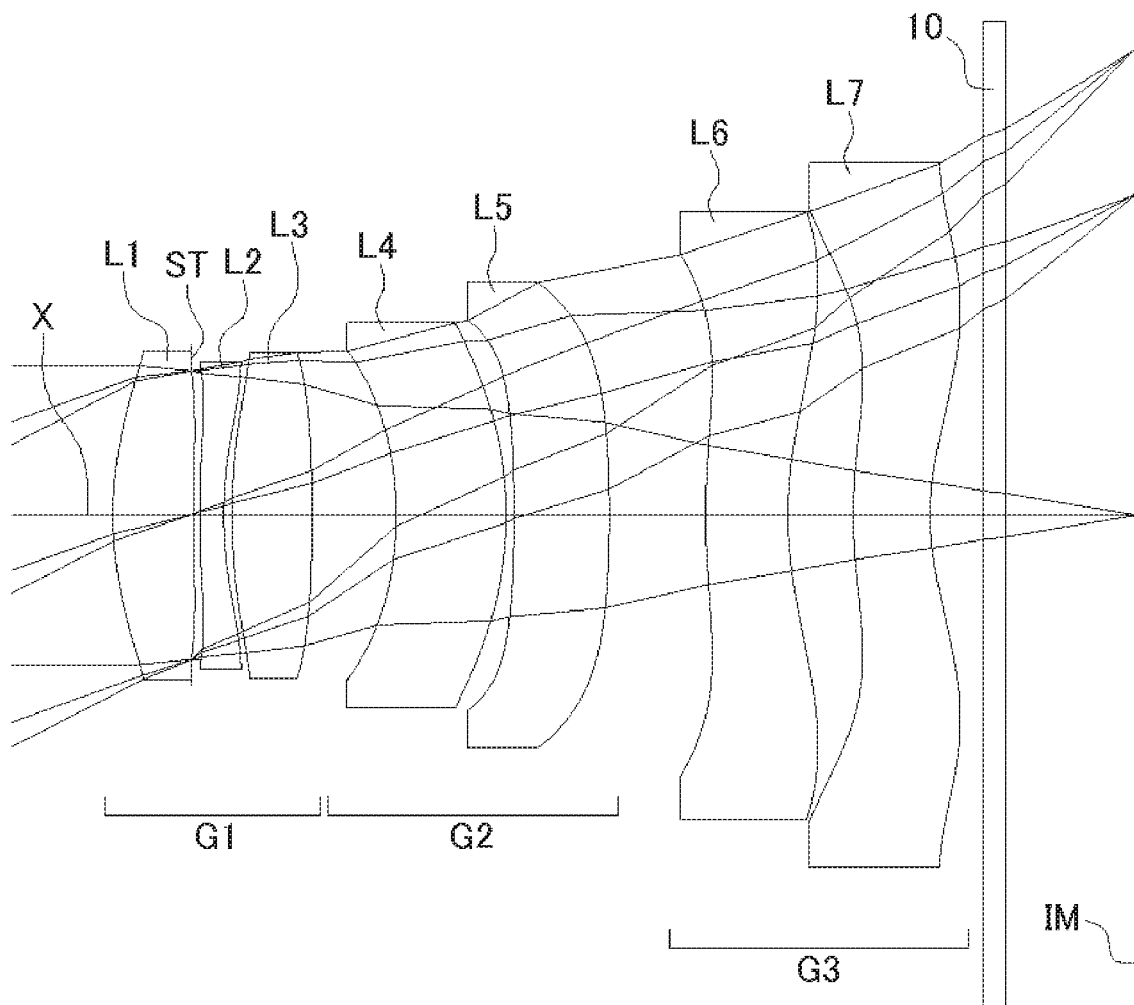
FIG. 1 shows a sectional view of a schematic configuration of an imaging lens in Numerical Data Example 1 according to an embodiment of the present invention.

As shown in FIG. 1, according to the embodiment, the imaging lens includes a first lens group G1 having positive refractive power, a second lens group G2 having positive refractive power, and a third lens group G3 having negative refractive power, arranged in the order from an object side to an image plane side. Between the third lens group G3 and an image plane IM of an imaging element, there is provided a filter 10. The filter 10 is omissible.

The first lens group G1 includes a first lens L1 having positive refractive power, an aperture stop ST, a second lens L2 having negative refractive power, and a third lens L3 having positive refractive power, arranged in the order from the object side.

The first lens L1 is formed in a shape such that a curvature radius r1 of an object-side surface thereof is positive and a curvature radius r2 of an image plane-side surface thereof is negative, so as to have a shape of a biconvex lens near an optical axis X. The shape of the first lens L1 is not limited to the one of Numerical Data Example 1. The shape of the first lens L1 can be any as long as the curvature radius r1 of the object-side surface thereof is positive. Therefore, the first lens L1 can be formed in a shape such that the curvature radius r2 of the image plane-side surface thereof is positive, i.e., a shape of a meniscus lens directing a convex surface thereof to the object side near the optical axis X. Numerical Data Examples 2, 3, and 5 are examples, in which the first lens L1 has a shape of a meniscus lens that directs a convex surface thereof to the object side near the optical axis X.

The second lens L2 is formed in a shape such that a curvature radius r4 of an object-side surface thereof and a curvature radius r5 of an image plane-side surface thereof are both positive, so as to have a shape of a meniscus lens directing a convex surface thereof to the object side near the optical axis X. Here, the shape of the second lens L2 is not limited to the one in Numerical Data Example 1. The shape of the second lens L2 can be any as long as the curvature radius r5 of the image plane-side surface thereof is positive. Therefore, the second lens L2 can be formed in a shape such that the curvature radius r4 of the object-side surface thereof is negative, i.e., a shape of a biconcave lens near the optical axis X.

The third lens L3 is formed in a shape such that a curvature radius r6 of an object-side surface thereof is positive and a curvature radius r7 of an image plane-side surface thereof is negative, so as to have a shape of a biconvex lens near the optical axis X. The shape of the third lens L3 is not limited to the one in Numerical Data Example 1. The shape of the third lens L3 can be any as long as the curvature radius r6 of the object-side surface thereof is positive. The third lens L3 can be formed in a shape such that the curvature radius r7 of the image plane-side surface thereof is positive, i.e., a shape of a meniscus lens directing a convex surface thereof to the object side near the optical axis X. Numerical Data Example 4 is an example, in which the third lens L3 has a shape of a meniscus lens directing a convex surface thereof to the object side near the optical axis X.

The second lens group G2 includes a fourth lens L4 having positive refractive power and a fifth lens L5 having positive refractive power, arranged in the order from the object side. In the second lens group G2, the fourth lens L4 is formed in a shape such that a curvature radius r8 of an object-side surface thereof and a curvature radius r9 of an image plane-side surface thereof are both negative, so as to have a shape of a meniscus lens directing a concave surface thereof to the object side near the optical axis X.

The fifth lens L5 is formed in a shape such that a curvature radius r10 of an object-side surface thereof and a curvature radius r11 of an image plane-side surface thereof are both negative, so as to have a shape of a meniscus lens directing a concave surface thereof to the object side near the optical axis X. Here, the shape of the fifth lens L5 is not limited to the one in Numerical Data Example 1. The shape of the fifth lens L5 can be any as long as the curvature radius r11 of the image plane-side surface thereof is negative. Therefore, the fifth lens L5 can be formed in a shape such that the curvature radius r10 of the object-side surface thereof is positive, i.e., a shape of a biconvex lens near the optical axis X. Numerical Data Example 2 is an example, in which the fifth lens L5 has a shape of a biconvex lens near the optical axis X.

The third lens group G3 includes a sixth lens L6 having negative refractive power and a seventh lens L7 having negative refractive power, arranged in the order from the object side. The sixth lens L6 is formed in a shape such that a curvature radius r12 of an object-side surface thereof and a curvature radius r13 of an image plane-side surface thereof are both positive, so as to have a shape of a meniscus lens directing a convex surface thereof to the object side near the optical axis X. In addition, the seventh lens L7 is formed in a shape such that a curvature radius r14 of an object-side surface thereof and a curvature radius r15 of an image plane-side surface thereof are both positive, so as to have a shape of a meniscus lens directing a convex surface thereof to the object side near the optical axis X.

The sixth lens L6 and the seventh lens L7 have the object-side surfaces and the image plane-side surfaces that are formed as aspheric shapes having inflexion points. In addition, the sixth lens L6 and the seventh lens L7 are formed in shapes such that their positive refractive powers become stronger from the optical axis X toward the lens peripheries. With such shapes of the sixth lens L6 and the seventh lens L7, it is achievable to satisfactorily correct the off-axis chromatic aberration of magnification as well as the axial chromatic aberration. Moreover, it is also achievable to suitably restrain the incident angle of a light beam emitted from the imaging lens to the image plane IM within the range of chief ray angle (CRA).

Here, according to the imaging lens in Numerical Data Example 1, the sixth lens L6 and the seventh lens L7 have the object-side surfaces and the image plane-side surfaces both of which are formed as aspheric shapes having inflexion points. However, it is not necessary to form the both surfaces as aspheric shapes having inflexion points. Even if only one of those surfaces is formed as an aspheric shape having an inflexion point, it is still possible to form one or both of those lenses such that the positive refractive power(s) become(s) stronger from the optical axis X toward the lens periphery/peripheries. Moreover, depending on required optical performance and the level of downsizing of the imaging lens, it may not be necessary to provide an inflexion point on the sixth lens L6 and the seventh lens L7.

According to the embodiment, the imaging lens satisfies the following conditional expressions (1) to (15):

$$40 < vd1 < 75 \quad (1)$$

$$20 < vd2 < 35 \quad (2)$$

$$40 < vd3 < 75 \quad (3)$$

$$40 < vd4 < 75 \quad (4)$$

$$20 < vd5 < 35 \quad (5)$$

$$20 < vd6 < 35 \quad (6)$$

$$40 < vd7 < 75 \quad (7)$$

$$0.3 < f3/f1 < 3.0 \quad (8)$$

$$-3.0 < f2/f3 < -0.3 \quad (9)$$

$$4.5 < f4/f < 9.0 \quad (10)$$

$$1.5 < f45/f < 5.0 \quad (11)$$

$$-6.0 < f45/f67 < -1.5 \quad (12)$$

$$0.05 < D34/f < 0.3 \quad (13)$$

$$0.05 < D56/f < 0.25 \quad (14)$$

$$-4.0 < f7/f < -1.0 \quad (15)$$

In the above conditional expressions:
vd1: Abbe's number of a first lens L1
vd2: Abbe's number of a second lens L2
vd3: Abbe's number of a third lens L3
vd4: Abbe's number of a fourth lens L4
vd5: Abbe's number of a fifth lens L5
vd6: Abbe's number of a sixth lens L6
vd7: Abbe's number of a seventh lens L7
f: Focal length of a whole lens system
f1: Focal length of the first lens L1
f2: Focal length of the second lens L2
f3: Focal length of the third lens L3
f4: Focal length of the fourth lens L4
f7: Focal length of the seventh lens L7
f45: Composite focal length of the fourth lens L4 and the fifth lens L5
f67: Composite focal length of the sixth lens L6 and the seventh lens L7
D34: Distance on the optical axis X between the third lens L3 and the fourth lens L4
D56: Distance on the optical axis X between the fifth lens L5 and the sixth lens L6

According to the embodiment, in order to more satisfactorily correct aberrations, the imaging lens satisfies the following conditional expression (16):

$$0.7 < f6/f7 < 1.4 \quad (16)$$

When the imaging lens satisfies the conditional expression (16), it is achievable to satisfactorily correct the distortion while restraining the incident angle of a light beam emitted from the imaging lens to the image plane IM within the range of CRA. When the value exceeds the upper limit of "1.4", although it is easy to restrain the incident angle of a light beam emitted from the imaging lens to the image plane IM within the range of CRA, the seventh lens L7 near the image plane IM has stronger refractive power than the refractive power of the sixth lens L6. Therefore, the distortion in the minus direction increases, and it is difficult to obtain satisfactory image-forming performance. On the other hand, when the value is below the lower limit of "0.7", the distortion in the plus direction increases, so that it is difficult to obtain satisfactory image-forming performance. Moreover, it is difficult to restrain the incident angle of a light beam emitted from the imaging lens to the image plane IM within the range of CRA.

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. When the aspheric shapes applied to the lens surfaces have an axis Z in a direction of the optical axis X, a height H in a direction perpendicular to the optical axis X, a conic constant k, and aspheric coefficients $A_4$, $A_6$, $A_8$, $A_{10}$, $A_{12}$, $A_{14}$, and $A_{16}$, the aspheric shapes of the lens surfaces are expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

[Formula 1]

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

Numerical Data Example 1

Basic data are shown below.
f=11.91 mm, Fno=2.9, ω=27.1°

| Unit: mm | | | | |
|---|---|---|---|---|
| Surface Data | | | | |
| Surface Number i | r | d | nd | vd |
| (Object) | ∞ | ∞ | | |
| 1* | 4.933 | 1.070 | 1.5346 | 56.1 (=vd1) |
| 2* | −930.893 | −0.035 | | |
| 3 (Stop) | ∞ | 0.112 | | |
| 4* | 18.923 | 0.311 | 1.6355 | 24.0 (=vd2) |
| 5* | 5.803 | 0.113 | | |
| 6* | 9.618 | 1.053 | 1.5346 | 56.1 (=vd3) |
| 7* | −26.477 | 1.108 (=D34) | | |
| 8* | −4.816 | 1.452 | 1.5346 | 56.1 (=vd4) |
| 9* | −4.880 | 0.100 | | |
| 10* | −20.892 | 1.258 | 1.6355 | 24.0 (=vd5) |
| 11* | −16.143 | 1.269 (=D56) | | |
| 12* | 10.109 | 1.086 | 1.6355 | 24.0 (=vd6) |

-continued

Unit: mm

| | | | | |
|---|---|---|---|---|
| 13* | 5.202 | 0.858 | | |
| 14* | 6.128 | 1.015 | 1.5346 | 56.1 (=vd7) |
| 15* | 3.566 | 0.700 | | |
| 16 | ∞ | 0.300 | 1.5168 | 64.2 |
| 17 | ∞ | 1.693 | | |
| (Image plane) | ∞ | | | |

Aspheric Surface Data

First Surface $k = 0.000, A_4 = -2.258E-03, A_6 = -1.716E-04, A_8 = -8.402E-05, A_{10} = 7.188E-06, A_{12} = -1.727E-07, A_{14} = -5.544E-08, A_{16} = -4.827E-09$
Second Surface $k = 0.000, A_4 = 1.813E-02, A_6 = -1.657E-02, A_8 = 5.660E-03, A_{10} = -9.632E-04, A_{12} = 3.919E-05, A_{14} = 9.322E-06, A_{16} = -9.282E-07$
Fourth Surface $k = 0.000, A_4 = 2.004E-02, A_6 = -2.109E-02, A_8 = 7.483E-03, A_{10} = -1.366E-03, A_{12} = 7.946E-05, A_{14} = 1.008E-05, A_{16} = -1.275E-06$
Fifth Surface $k = 0.000, A_4 = 1.328E-02, A_6 = -1.197E-02, A_8 = 2.756E-03, A_{10} = -3.323E-04, A_{12} = 9.334E-06, A_{14} = 1.543E-06, A_{16} = 6.238E-09$
Sixth Surface $k = 0.000, A_4 = 1.412E-02, A_6 = -7.356E-03, A_8 = 1.464E-03, A_{10} = -1.635E-04, A_{12} = 9.896E-06, A_{14} = 3.578E-07, A_{16} = -7.427E-08$
Seventh Surface $k = 0.000, A_4 = -4.229E-03, A_6 = -6.810E-04, A_8 = 2.136E-04, A_{10} = -1.640E-05, A_{12} = -8.553E-07, A_{14} = -3.664E-07, A_{16} = 1.570E-08$
Eighth Surface $k = 0.000, A_4 = -7.525E-03, A_6 = 4.344E-04, A_8 = 1.460E-04, A_{10} = -4.222E-05, A_{12} = -2.416E-07, A_{14} = 2.207E-07, A_{16} = 2.681E-08$
Ninth Surface $k = 0.000, A_4 = -1.153E-03, A_6 = 4.237E-04, A_8 = -3.266E-06, A_{10} = 1.184E-06, A_{12} = -1.703E-06, A_{14} = 6.357E-08, A_{16} = 2.051E-08$
Tenth Surface $k = 0.000, A_4 = -2.682E-03, A_6 = -4.429E-04, A_8 = -8.312E-05, A_{10} = 2.024E-06, A_{12} = -9.278E-07, A_{14} = -1.690E-08, A_{16} = 5.362E-09$
Eleventh Surface $k = 0.000, A_4 = -2.770E-03, A_6 = -5.065E-04, A_8 = 7.597E-06, A_{10} = -1.210E-06, A_{12} = 3.920E-08, A_{14} = 4.009E-09, A_{16} = -4.901E-11$
Twelfth Surface $k = 0.000, A_4 = -7.263E-03, A_6 = -2.582E-06, A_8 = -1.576E-06, A_{10} = 3.658E-07, A_{12} = 1.955E-08, A_{14} = 6.544E-10, A_{16} = -1.041E-10$
Thirteenth Surface $k = 0.000, A_4 = -7.953E-03, A_6 = 1.117E-04, A_8 = 1.769E-06, A_{10} = -1.619E-07, A_{12} = 1.220E-09, A_{14} = -7.531E-11, A_{16} = 1.176E-12$
Fourteenth Surface $k = 0.000, A_4 = -1.499E-02, A_6 = 4.386E-04, A_8 = 4.879E-07, A_{10} = 1.022E-07, A_{12} = -2.511E-09, A_{14} = -4.879E-10, A_{16} = 6.044E-12$
Fifteenth Surface $k = -5.275, A_4 = -7.965E-03, A_6 = 3.077E-04, A_8 = -7.619E-06, A_{10} = 1.795E-07, A_{12} = 8.605E-09, A_{14} = -5.893E-10, A_{16} = 8.607E-12$ f1 = 9.18 mm
f2 = -13.29 mm
f3 = 13.33 mm
f4 = 99.43 mm
f5 = 101.31 mm
f6 = -18.45 mm -continued Unit: mm f7 = -18.52 mm
f45 = 48.43 mm
f67 = -8.78 mm The values of the respective conditional expressions are as follows:

$f3/f1=1.45$ $f2/f3=-1.00$ $f4/f=8.35$ $f45/f=4.07$ $f45/f67=-5.51$ $D34/f=0.09$ $D56/f=0.11$ $f7/f=-1.55$ $f2/f1=-1.45$ $f6/f7=1.00$

Accordingly, the imaging lens of Numerical Data Example 1 satisfies the above-described conditional expressions. The distance on the optical axis X from the object-side surface of the first lens L1 to the image plane IM (length without the filter 10) is 13.36 mm, and downsizing of the imaging lens is attained.

Figure 2:
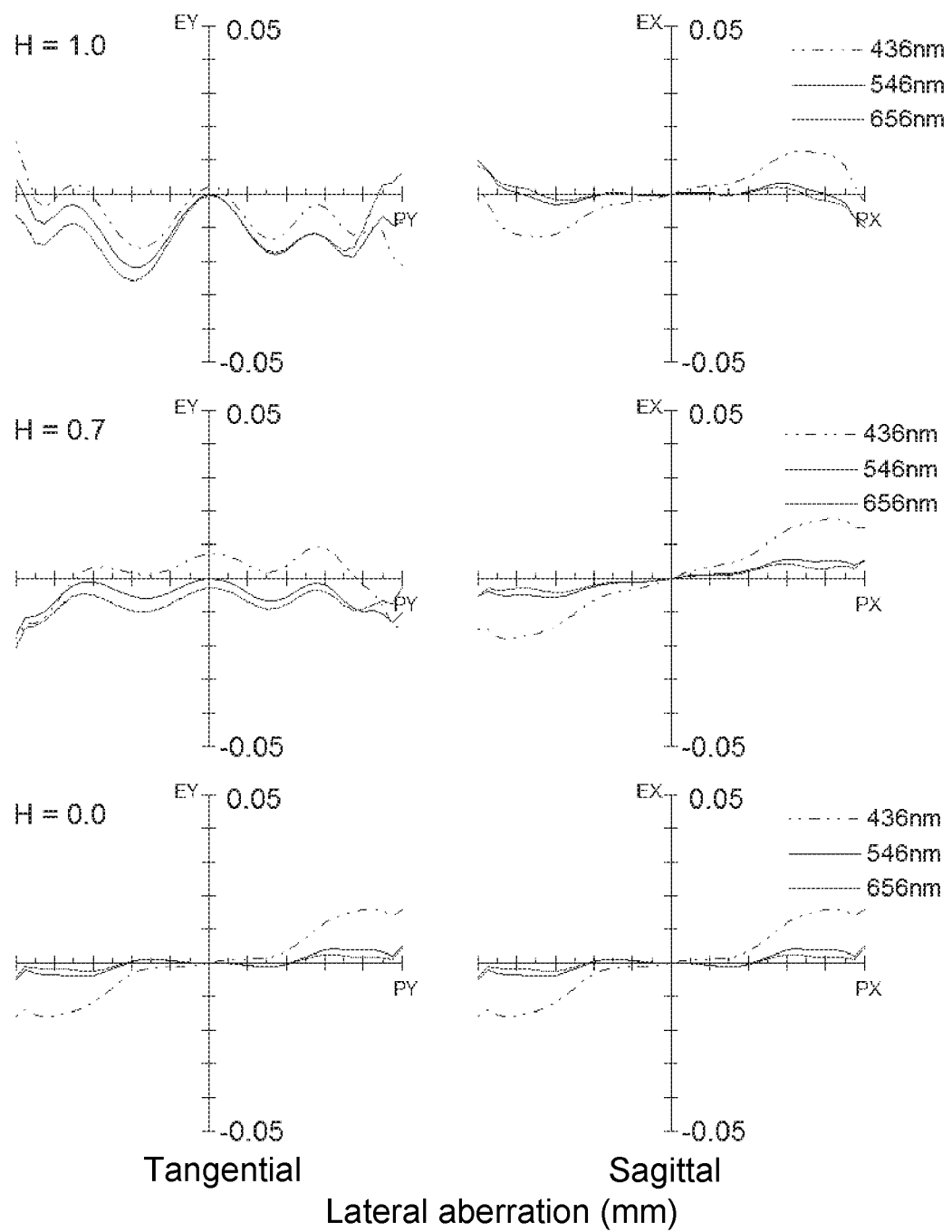
FIG. 2 is an aberration diagram showing a lateral aberration of the imaging lens of FIG. 1.
Figure 3:
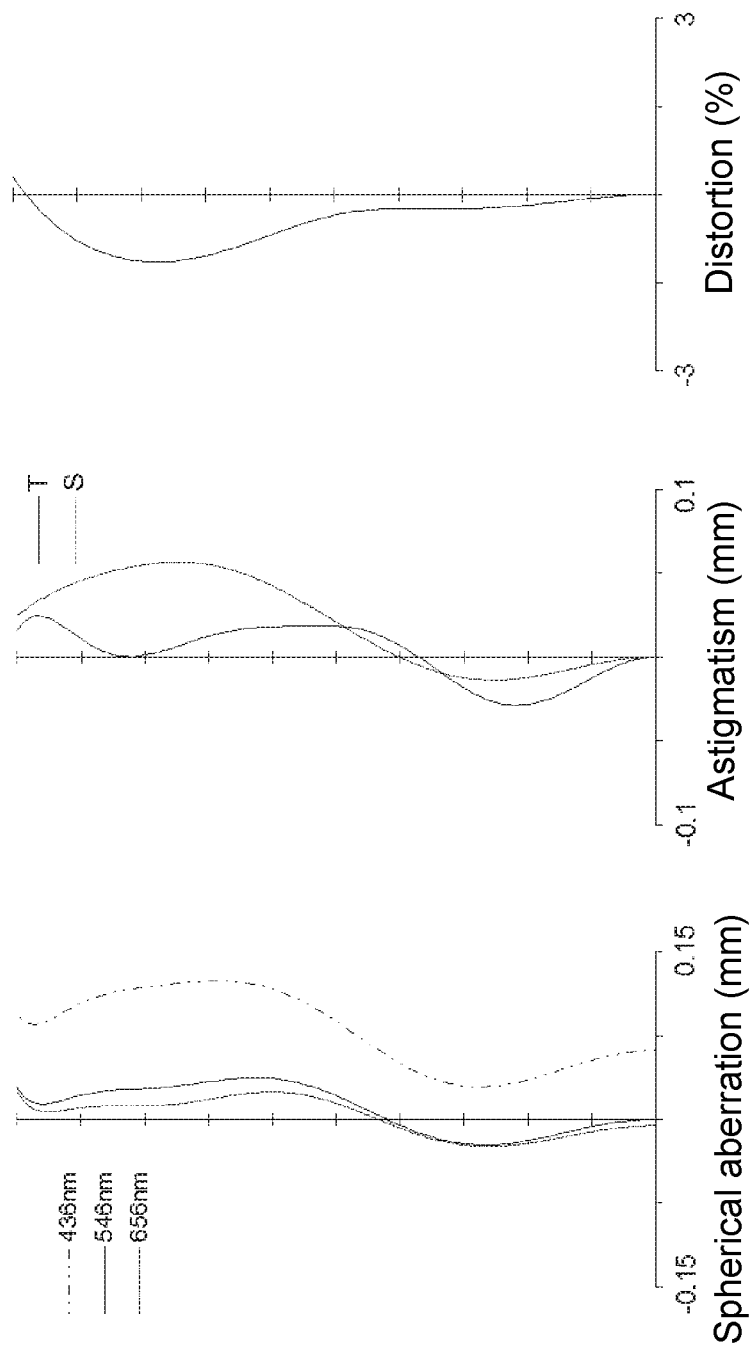
FIG. 3 is an aberration diagram showing a spherical aberration, astigmatism, and a distortion of the imaging lens of FIG. 1.
Figure 4:
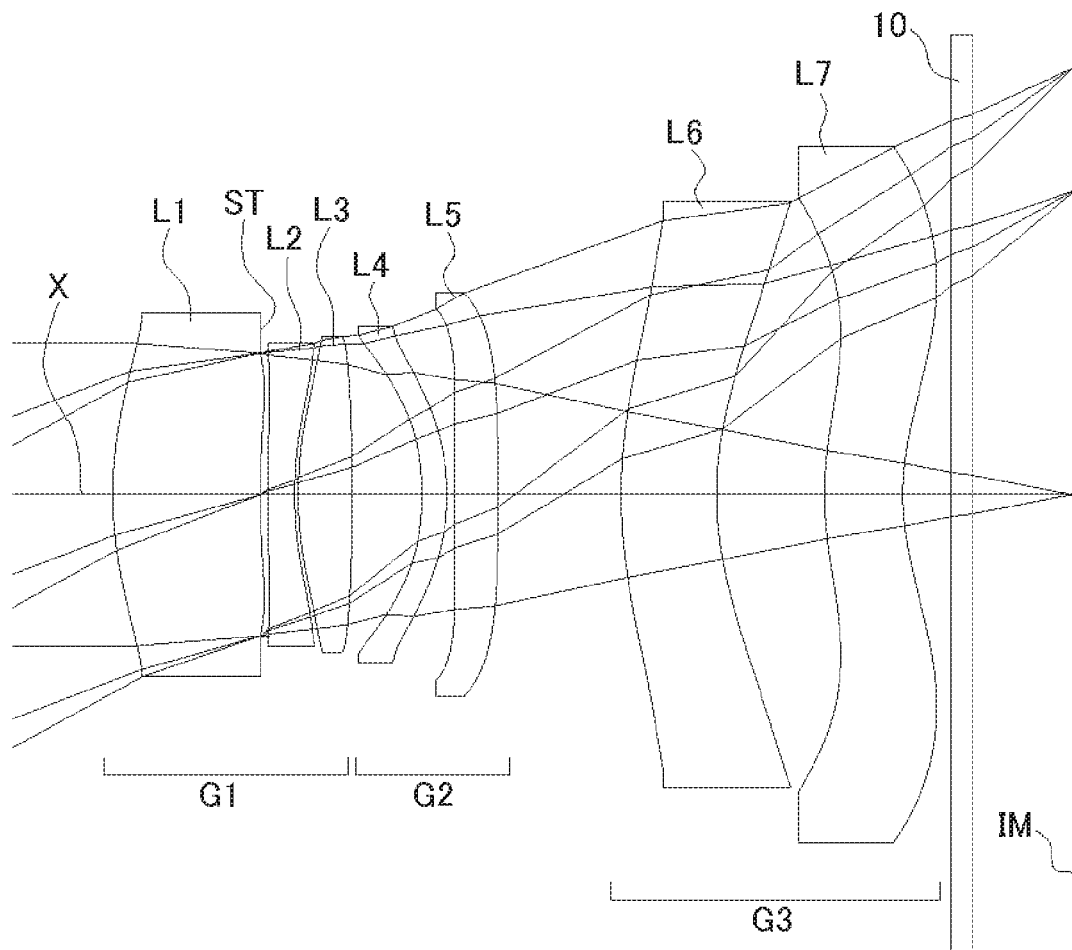
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, 14, and 17), in the imaging lens of Numerical Data Example 1. Furthermore, FIG. 3 shows a spherical aberration (mm), astigmatism (mm), and a distortion (%), respectively, of the imaging lens of Numerical Data Example 1. In the lateral aberration diagrams and spherical aberration diagrams, aberrations at each wavelength, i.e. a g line (435.84 nm), an e line (546.07 nm), and a C line (656.27 nm) are indicated. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

Numerical Data Example 2

Basic data are shown below.
f=11.12 mm, Fno=2.4, ω=28.7°

Unit: mm

Surface Data

| Surface Number i | r | d | nd | vd |
|---|---|---|---|---|
| (Object) | ∞ | ∞ | | |
| 1* | 5.672 | 2.085 | 1.5346 | 56.1 (=vd1) |

-continued

Unit: mm

| | | | | |
|---|---|---|---|---|
| 2* | 13.631 | −0.0003 | | |
| 3 (Stop) | ∞ | 0.105 | | |
| 4* | 40.182 | 0.382 | 1.6355 | 24.0 (=vd2) |
| 5* | 6.117 | 0.049 | | |
| 6* | 5.905 | 0.762 | 1.5346 | 56.1 (=vd3) |
| 7* | −38.291 | 0.990 (=D34) | | |
| 8* | −3.431 | 0.350 | 1.5346 | 56.1 (=vd4) |
| 9* | −3.240 | 0.108 | | |
| 10* | 84.917 | 0.616 | 1.6355 | 24.0 (=vd5) |
| 11* | −58.992 | 1.736 (=D56) | | |
| 12* | 7.052 | 1.350 | 1.6355 | 24.0 (=vd6) |
| 13* | 4.789 | 1.526 | | |
| 14* | 4.948 | 1.105 | 1.5346 | 56.1 (=vd7) |
| 15* | 3.686 | 0.680 | | |
| 16 | ∞ | 0.300 | 1.5168 | 64.2 |
| 17 | ∞ | 1.414 | | |
| (Image plane) | ∞ | | | |

Aspheric Surface Data

First Surface $k=0.000, A_4=-1.916E-03, A_6=-2.614E-04, A_8=-4.202E-05, A_{10}=9.800E-06, A_{12}=-5.793E-07, A_{14}=-1.528E-07, A_{16}=1.302E-08$ Second Surface $k=0.000, A_4=1.459E-02, A_6=-1.720E-02, A_8=5.644E-03, A_{10}=-9.641E-04, A_{12}=4.106E-05, A_{14}=9.797E-06, A_{16}=-9.797E-07$ Fourth Surface $k=0.000, A_4=2.300E-02, A_6=-2.066E-02, A_8=7.394E-03, A_{10}=-1.370E-03, A_{12}=8.034E-05, A_{14}=1.017E-05, A_{16}=-1.197E-06$ Fifth Surface $k=0.000, A_4=1.452E-02, A_6=-1.176E-02, A_8=2.846E-03, A_{10}=-3.407E-04, A_{12}=7.751E-06, A_{14}=1.645E-06, A_{16}=4.227E-08$ Sixth Surface $k=0.000, A_4=9.445E-03, A_6=-7.185E-03, A_8=1.433E-03, A_{10}=-1.523E-04, A_{12}=1.116E-05, A_{14}=2.227E-07, A_{16}=-1.217E-07$ Seventh Surface $k=0.000, A_4=-1.799E-03, A_6=-3.115E-04, A_8=1.941E-04, A_{10}=-1.459E-05, A_{12}=-3.805E-07, A_{14}=-4.646E-07, A_{16}=-5.256E-08$ Eighth Surface $k=0.000, A_4=-1.097E-02, A_6=1.037E-03, A_8=2.046E-04, A_{10}=-3.179E-05, A_{12}=9.872E-07, A_{14}=3.226E-07, A_{16}=2.150E-08$ Ninth Surface $k=0.000, A_4=-2.374E-04, A_6=7.402E-04, A_8=6.618E-05, A_{10}=9.578E-06, A_{12}=-8.457E-07, A_{14}=1.366E-07, A_{16}=3.483E-08$ Tenth Surface $k=0.000, A_4=8.502E-05, A_6=-6.845E-04, A_8=-3.961E-05, A_{10}=7.821E-06, A_{12}=-3.182E-07, A_{14}=-2.580E-08, A_{16}=-1.121E-08$ Eleventh Surface $k=0.000, A_4=-3.546E-03, A_6=-1.316E-04, A_8=-5.946E-06, A_{10}=-1.087E-06, A_{12}=8.261E-09, A_{14}=-8.166E-09, A_{16}=-1.513E-09$ Twelfth Surface $k=0.000, A_4=-2.321E-03, A_6=-1.480E-04, A_8=1.069E-05, A_{10}=5.462E-08, A_{12}=-1.313E-08, A_{14}=4.805E-10, A_{16}=-2.217E-11$ Thirteenth Surface $k=0.000, A_4=-5.114E-03, A_6=9.282E-05, A_8=-4.615E-06, A_{10}=-1.475E-08, A_{12}=1.042E-08, A_{14}=-8.901E-11, A_{16}=-1.395E-11$ Fourteenth Surface $k=0.000, A_4=-1.462E-02, A_6=5.096E-04, A_8=-6.553E-06, A_{10}=2.050E-08, A_{12}=-1.745E-08, A_{14}=-7.332E-10, A_{16}=6.119E-11$ -continued Unit: mm Fifteenth Surface $k=-3.374, A_4=-8.463E-03, A_6=4.184E-04, A_8=-1.373E-05, A_{10}=1.279E-07, A_{12}=1.100E-08, A_{14}=-5.270E-10, A_{16}=7.656E-12$

| | |
|---|---|
| f1 = 16.65 mm |
| f2 = −11.40 mm |
| f3 = 9.63 mm |
| f4 = 66.37 mm |
| f5 = 54.86 mm |
| f6 = −30.56 mm |
| f7 = −38.90 mm |
| f45 = 29.54 mm |
| f67 = 16.33 mm |

The values of the respective conditional expressions are as follows:

$f3/f1=0.58$ $f2/f3=-1.18$ $f4/f=5.97$ $f45/f=2.66$ $f45/f67=-1.81$ $D34/f=0.09$ $D56/f=0.16$ $f7/f=-3.50$ $f2/f1=-0.68$ $f6/f7=0.79$

Accordingly, the imaging lens of Numerical Data Example 2 satisfies the above-described conditional expressions. The distance on the optical axis X from the object-side surface of the first lens L1 to the image plane IM (length without the filter 10) is 13.46 mm, and downsizing of the imaging lens is attained.

Figure 5:
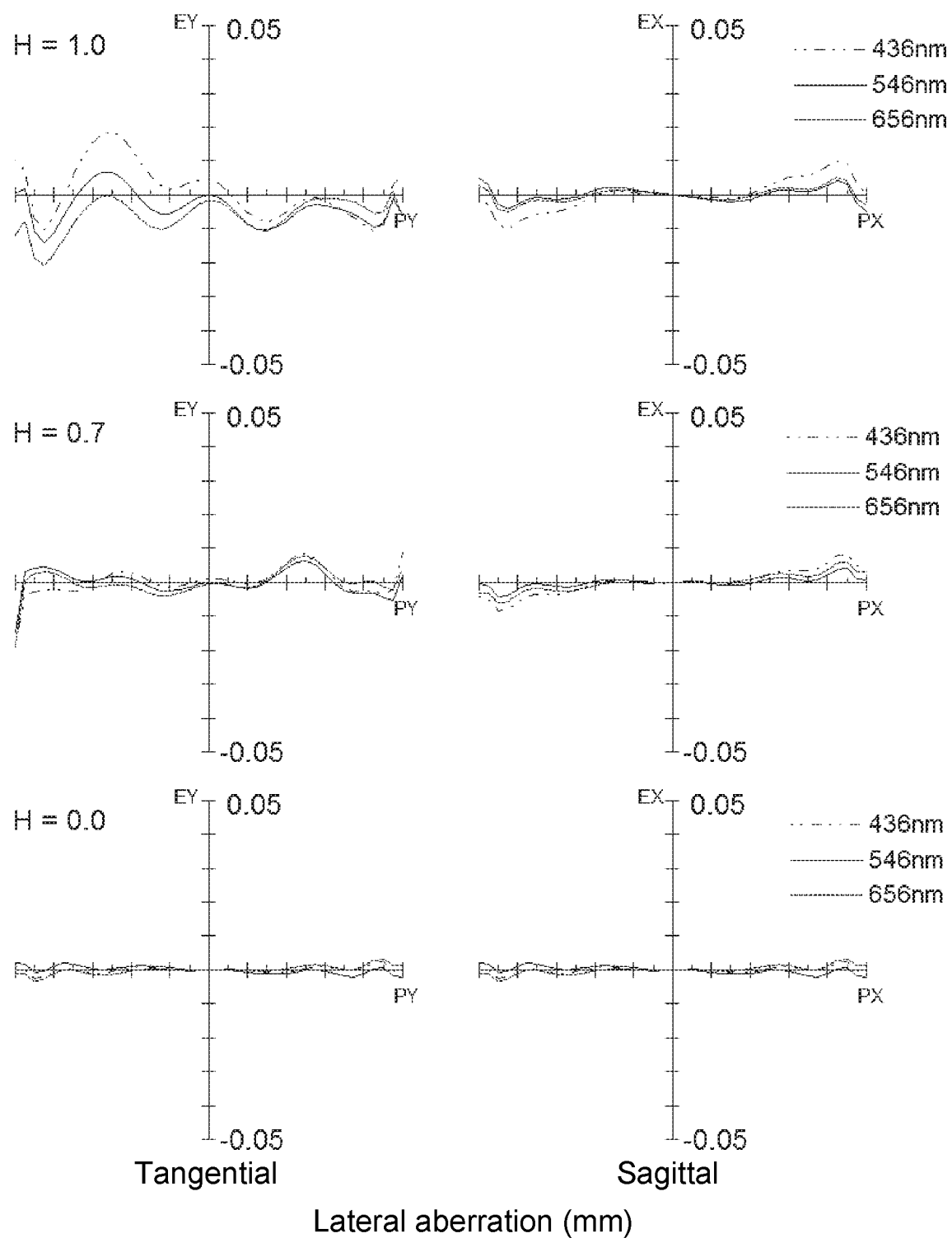
FIG. 5 is an aberration diagram showing a lateral aberration of the imaging lens of FIG. 4.
Figure 6:
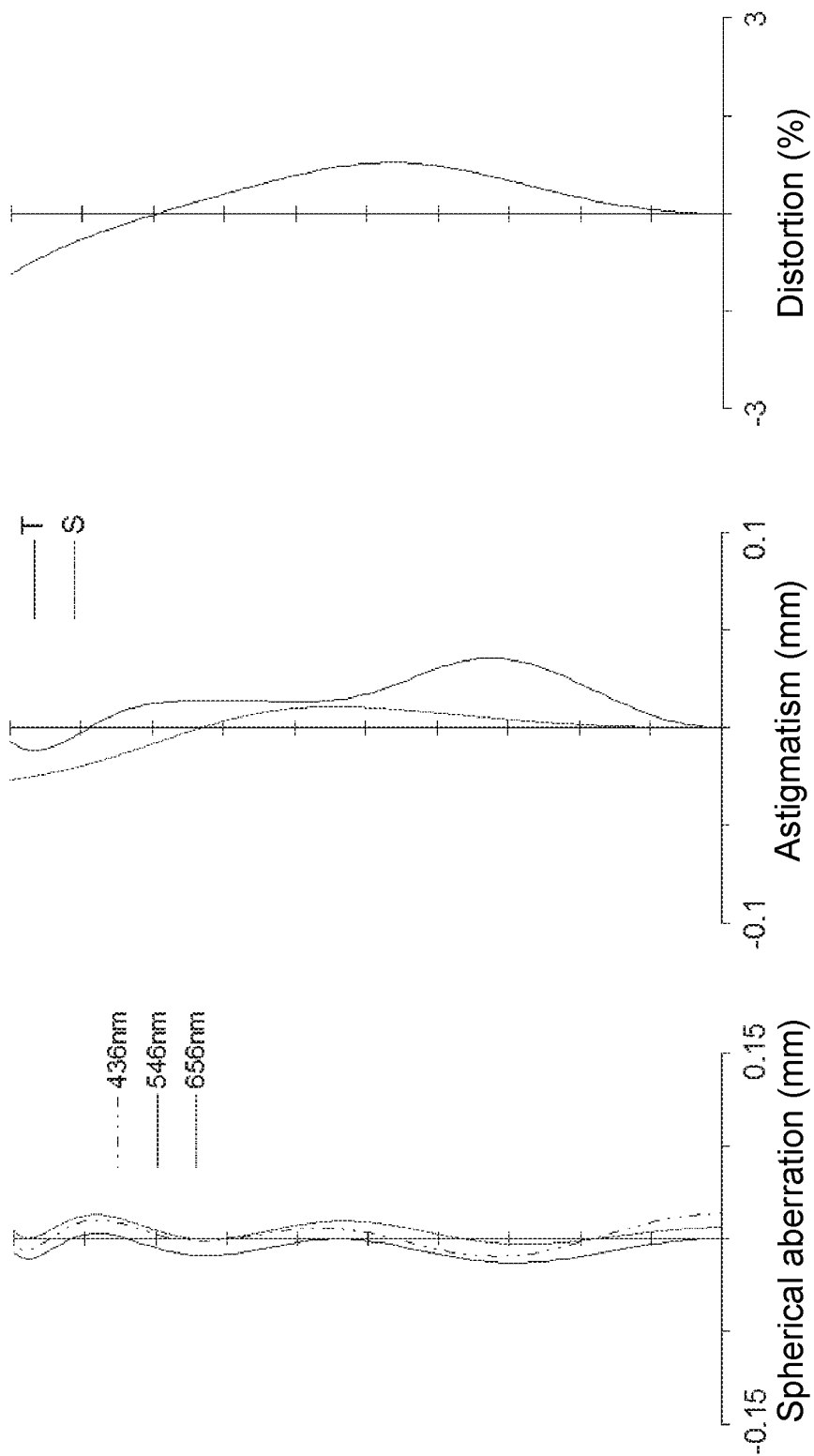
FIG. 6 is an aberration diagram showing a spherical aberration, astigmatism, and a distortion of the imaging lens of FIG. 4.
Figure 7:
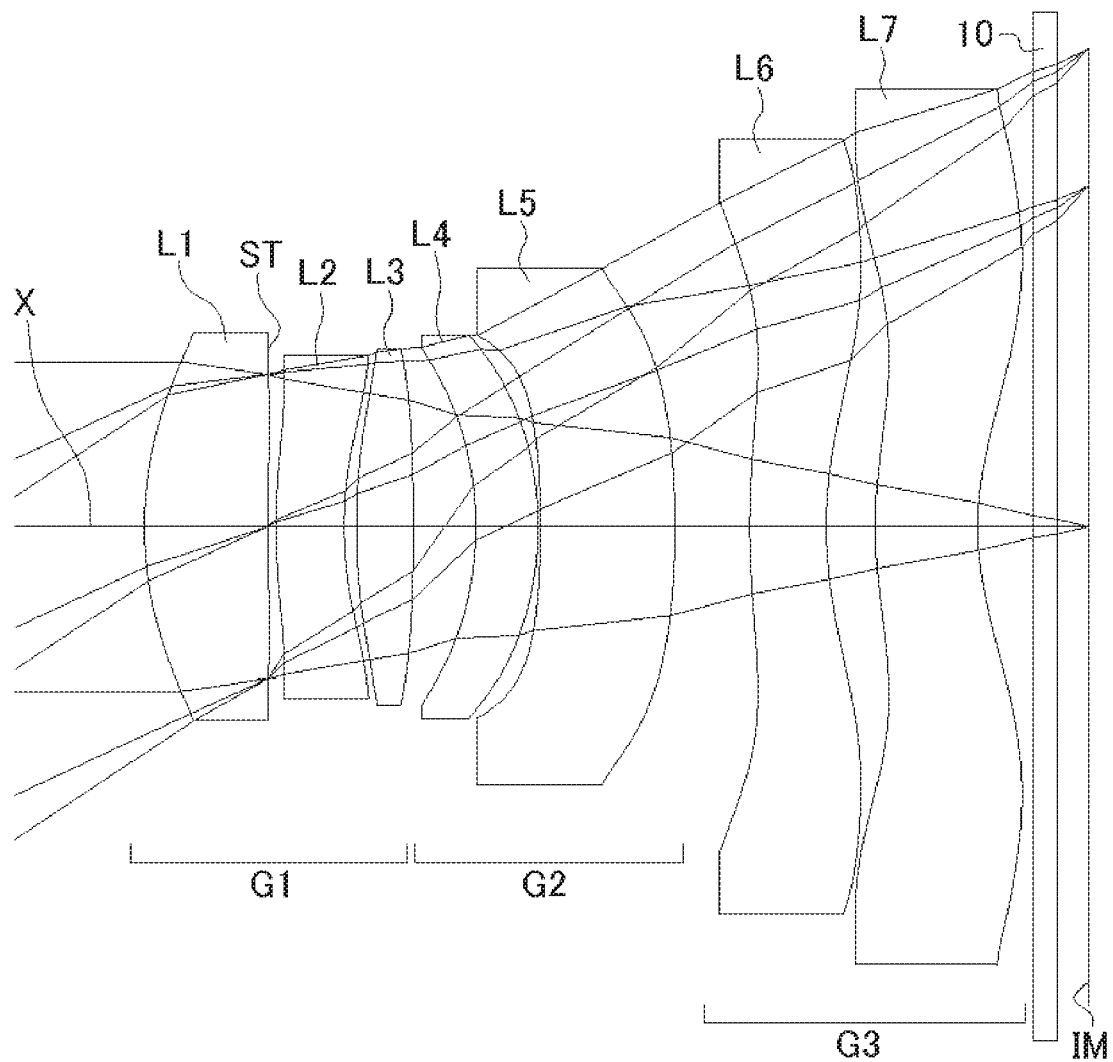
FIG. 7 shows a sectional view of a schematic configuration of an imaging lens in Numerical Data Example 3 according to the embodiment of the present invention.

FIG. 5 shows a lateral aberration that corresponds to the image height ratio H of the imaging lens, and FIG. 6 shows a spherical aberration (mm), astigmatism (mm), and a distortion (%), respectively, of the imaging lens of Numerical Data Example 2. As shown in FIGS. 5 and 6, according to the imaging lens of Numerical Data Example 2, the aberrations are also satisfactorily corrected.

Numerical Data Example 3

Basic data are shown below.
f=9.16 mm, Fno=2.2, ω=33.6°

Unit: mm

Surface Data

| Surface Number i | r | d | nd | vd |
|---|---|---|---|---|
| (Object) | ∞ | ∞ | | |
| 1* | 4.686 | 1.560 | 1.5346 | 56.1 (=vd1) |
| 2* | 44.083 | −0.003 | | |
| 3 (Stop) | ∞ | 0.105 | | |

-continued

| | | | Unit: mm | |
|---|---|---|---|---|
| 4* | 9.892 | 0.859 | 1.6355 | 24.0 (=vd2) |
| 5* | 5.248 | 0.157 | | |
| 6* | 9.581 | 0.717 | 1.5346 | 56.1 (=vd3) |
| 7* | −35.654 | 0.786 (=D34) | | |
| 8* | −4.605 | 0.788 | 1.5346 | 56.1 (=vd4) |
| 9* | −4.271 | 0.030 | | |
| 10* | −12.412 | 1.699 | 1.6355 | 24.0 (=vd5) |
| 11* | −10.957 | 0.942 (=D56) | | |
| 12* | 9.961 | 0.965 | 1.6355 | 24.0 (=vd6) |
| 13* | 5.142 | 0.623 | | |
| 14* | 5.891 | 1.292 | 1.5346 | 56.1 (=vd7) |
| 15* | 3.732 | 0.700 | | |
| 16 | ∞ | 0.300 | 1.5168 | 64.2 |
| 17 (Image plane) | ∞ | 0.400 | | |
| | ∞ | | | |

Aspheric Surface Data

First Surface $k = 0.000, A_4 = -5.228E-04, A_6 = 5.257E-05, A_8 = -7.167E-05, A_{10} = 6.642E-06, A_{12} = -2.064E-07, A_{14} = -1.718E-08, A_{16} = -3.672E-09$ Second Surface $k = 0.000, A_4 = 1.706E-02, A_6 = -1.665E-02, A_8 = 5.716E-03, A_{10} = -9.533E-04, A_{12} = 4.016E-05, A_{14} = 9.227E-06, A_{16} = -1.010E-06$ Fourth Surface $k = 0.000, A_4 = 1.824E-02, A_6 = -2.073E-02, A_8 = 7.501E-03, A_{10} = -1.362E-03, A_{12} = 8.090E-05, A_{14} = 1.019E-05, A_{16} = -1.349E-06$ Fifth Surface $k = 0.000, A_4 = 1.418E-02, A_6 = -1.191E-02, A_8 = 2.763E-03, A_{10} = -3.305E-04, A_{12} = 9.678E-06, A_{14} = 1.516E-06, A_{16} = -3.088E-08$ Sixth Surface $k = 0.000, A_4 = 1.439E-02, A_6 = -7.365E-03, A_8 = 1.463E-03, A_{10} = -1.649E-04, A_{12} = 9.715E-06, A_{14} = 3.826E-07, A_{16} = -5.052E-08$ Seventh Surface $k = 0.000, A_4 = -4.115E-03, A_6 = -4.089E-04, A_8 = 2.326E-04, A_{10} = -1.364E-05, A_{12} = -4.022E-07, A_{14} = -3.544E-07, A_{16} = 2.426E-10$ Eighth Surface $k = 0.000, A_4 = -8.156E-03, A_6 = 7.335E-04, A_8 = 1.820E-04, A_{10} = -3.874E-05, A_{12} = 9.548E-08, A_{14} = 2.413E-07, A_{16} = 3.202E-08$ Ninth Surface $k = 0.000, A_4 = -3.284E-03, A_6 = 1.711E-04, A_8 = -3.665E-05, A_{10} = -1.211E-06, A_{12} = -1.670E-06, A_{14} = 1.315E-07, A_{16} = 3.488E-08$ Tenth Surface $k = 0.000, A_4 = -3.774E-03, A_6 = -1.071E-03, A_8 = -1.090E-04, A_{10} = -1.136E-06, A_{12} = -1.366E-06, A_{14} = -6.579E-08, A_{16} = -7.522E-09$ Eleventh Surface $k = 0.000, A_4 = -1.977E-03, A_6 = -3.375E-04, A_8 = 5.840E-06, A_{10} = -9.285E-07, A_{12} = 9.105E-08, A_{14} = 7.992E-09, A_{16} = 1.009E-11$ Twelfth Surface $k = 0.000, A_4 = -5.918E-03, A_6 = -1.970E-05, A_8 = 2.285E-06, A_{10} = 2.484E-07, A_{12} = 6.113E-09, A_{14} = 6.331E-10, A_{16} = -6.092E-11$ Thirteenth Surface $k = 0.000, A_4 = -7.396E-03, A_6 = 8.056E-05, A_8 = 2.029E-06, A_{10} = -9.873E-08, A_{12} = 3.717E-09, A_{14} = -5.325E-11, A_{16} = -5.178E-12$ Fourteenth Surface $k = 0.000, A_4 = -1.274E-02, A_6 = 4.084E-04, A_8 = -7.883E-07, A_{10} = 4.755E-08, A_{12} = -4.159E-09, A_{14} = -4.673E-10, A_{16} = 1.490E-11$ -continued Unit: mm Fifteenth Surface $k = -4.383, A_4 = -5.567E-03, A_6 = 2.400E-04, A_8 = -9.162E-06, A_{10} = 1.827E-07, A_{12} = 9.388E-09, A_{14} = -5.768E-10, A_{16} = 8.323E-12$

| |
|---|
| f1 = 9.67 mm |
| f2 = −18.95 mm |
| f3 = 14.20 mm |
| f4 = 60.48 mm |
| f5 = 101.17 mm |
| f6 = −18.14 mm |
| f7 = −24.06 mm |
| f45 = 38.45 mm |
| f67 = −9.69 mm |

The values of the respective conditional expressions are as follows:

$f3/f1 = 1.47$ $f2/f3 = -1.33$ $f4/f = 6.60$ $f45/f = 4.20$ $f45/f67 = -3.97$ $D34/f = 0.09$ $D56/f = 0.10$ $f7/f = -2.63$ $f2/f1 = -1.96$ $f6/f7 = 0.75$

Accordingly, the imaging lens of Numerical Data Example 3 satisfies the above-described conditional expressions. The distance on the optical axis X from the object-side surface of the first lens L1 to the image plane IM (length without the filter 10) is 11.82 mm, and downsizing of the imaging lens is attained.

Figure 8:
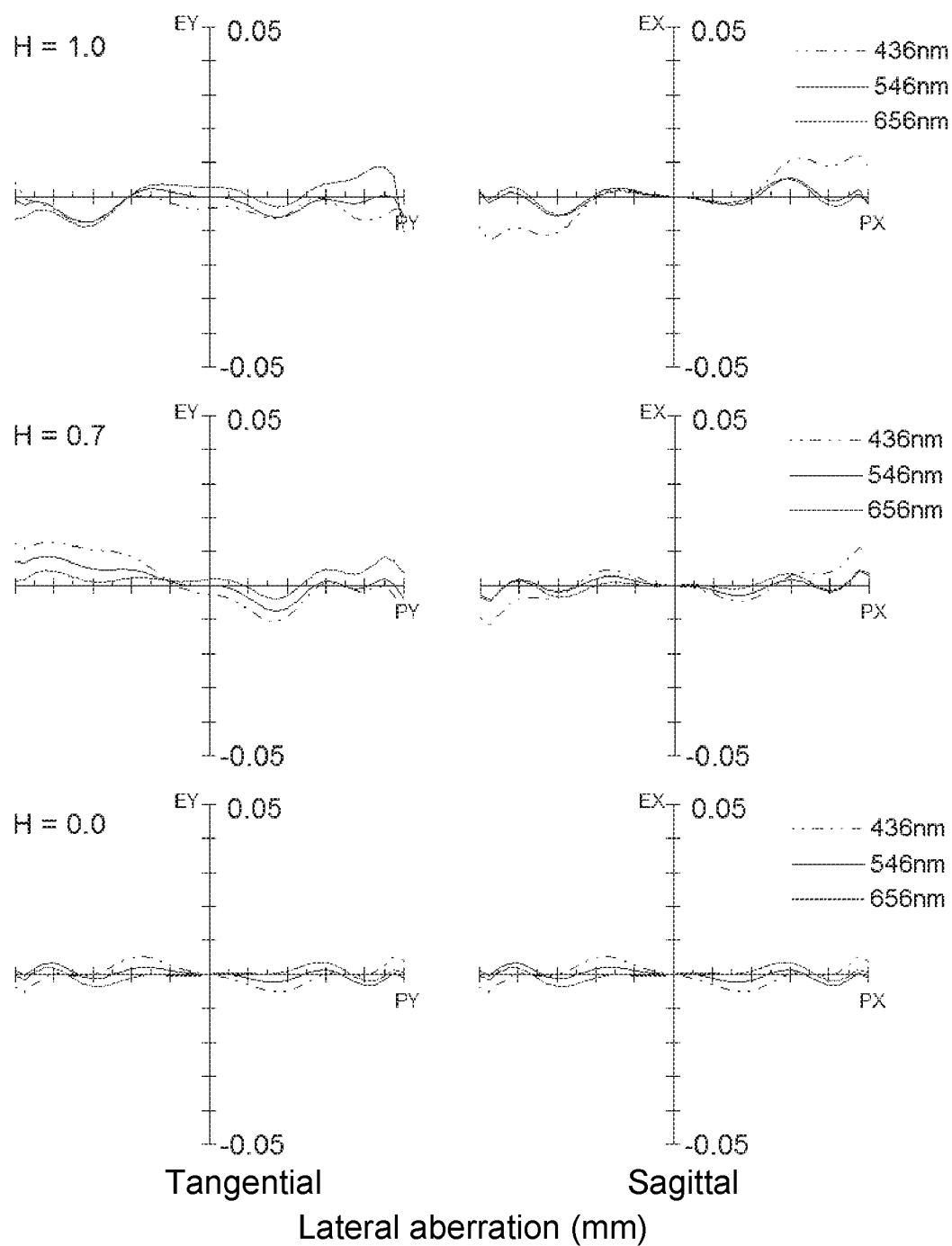
FIG. 8 is an aberration diagram showing a lateral aberration of the imaging lens of FIG. 7.
Figure 9:
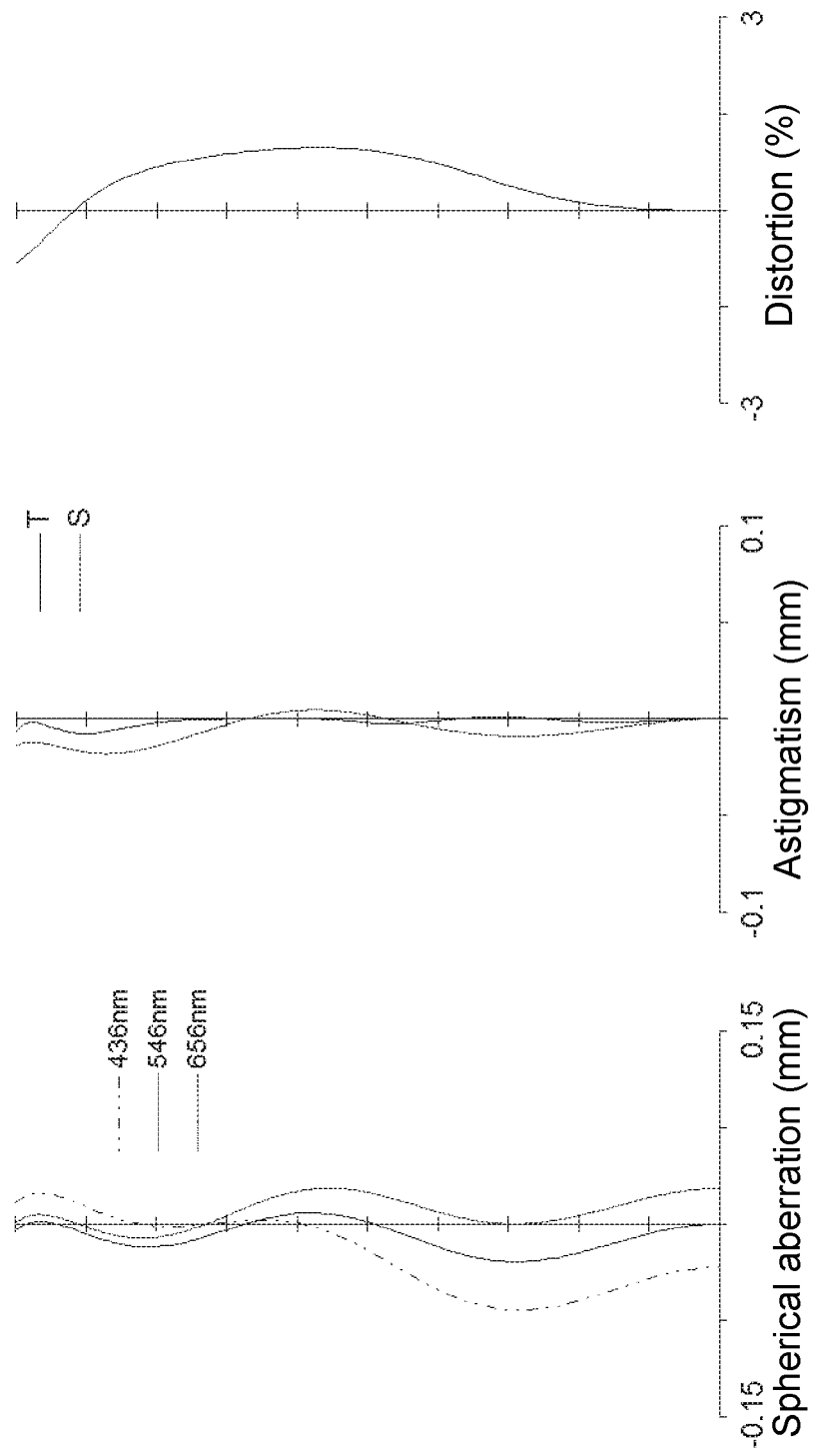
FIG. 9 is an aberration diagram showing a spherical aberration, astigmatism, and a distortion of the imaging lens of FIG. 7.
Figure 10:
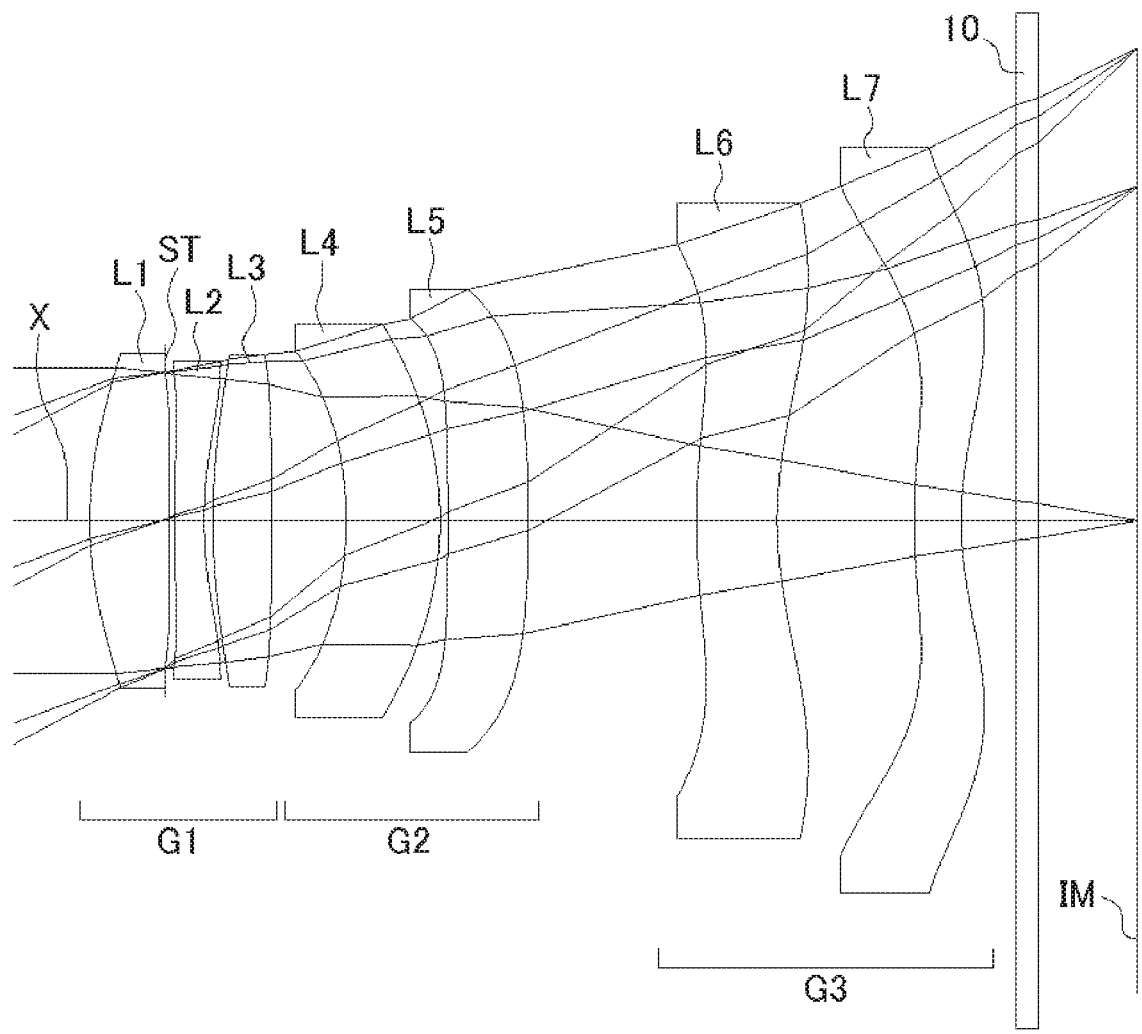
FIG. 10 shows a sectional view of a schematic configuration of an imaging lens in Numerical Data Example 4 according to the embodiment of the present invention.

FIG. 8 shows a lateral aberration that corresponds to the image height ratio H of the imaging lens, and FIG. 9 shows a spherical aberration (mm), astigmatism (mm), and a distortion (%), respectively in the imaging lens of Numerical Data Example 3. As shown in FIGS. 8 and 9, according to the imaging lens of Numerical Data Example 3, the aberrations are also satisfactorily corrected.

Numerical Data Example 4

Basic data are shown below.
f=11.52 mm, Fno=2.8, ω=27.9°

| | Unit: mm | | | |
|---|---|---|---|---|
| | Surface Data | | | |
| Surface Number i | r | d | nd | vd |
| (Object) | ∞ | ∞ | | |
| 1* | 5.117 | 1.025 | 1.5346 | 56.1 (=vd1) |
| 2* | −53.792 | −0.065 | | |
| 3 (Stop) | ∞ | 0.121 | | |

-continued

Unit: mm

| | | | | |
|---|---|---|---|---|
| 4* | 33.647 | 0.385 | 1.6355 | 24.0 (=vd2) |
| 5* | 6.316 | 0.111 | | |
| 6* | 11.172 | 0.746 | 1.5346 | 56.1 (=vd3) |
| 7* | 261.521 | 0.961 (=D34) | | |
| 8* | −4.905 | 1.202 | 1.5346 | 56.1 (=vd4) |
| 9* | −4.564 | 0.100 | | |
| 10* | −63.334 | 1.035 | 1.6355 | 24.0 (=vd5) |
| 11* | −18.755 | 2.149 (=D56) | | |
| 12* | 8.382 | 1.036 | 1.6355 | 24.0 (=vd6) |
| 13* | 5.211 | 1.755 | | |
| 14* | 7.275 | 0.599 | 1.5346 | 56.1 (=vd7) |
| 15* | 4.224 | 0.700 | | |
| 16 | ∞ | 0.300 | 1.5168 | 64.2 |
| 17 | ∞ | 1.259 | | |
| (Image plane) | ∞ | | | |

Aspheric Surface Data

First Surface $k = 0.000, A_4 = -2.207E-03, A_6 = -6.989E-05, A_8 = -7.646E-05, A_{10} = 6.537E-06, A_{12} = -4.816E-07, A_{14} = -8.199E-08, A_{16} = 3.638E-09$
Second Surface $k = 0.000, A_4 = 1.851E-02, A_6 = -1.657E-02, A_8 = 5.668E-03, A_{10} = -9.618E-04, A_{12} = 3.914E-05, A_{14} = 9.359E-06, A_{16} = -9.285E-07$
Fourth Surface $k = 0.000, A_4 = 2.025E-02, A_6 = -2.097E-02, A_8 = 7.489E-03, A_{10} = -1.365E-03, A_{12} = 7.992E-05, A_{14} = 1.014E-05, A_{16} = -1.285E-06$
Fifth Surface $k = 0.000, A_4 = 1.323E-02, A_6 = -1.195E-02, A_8 = 2.773E-03, A_{10} = -3.309E-04, A_{12} = 9.229E-06, A_{14} = 1.525E-06, A_{16} = 2.021E-08$
Sixth Surface $k = 0.000, A_4 = 1.386E-02, A_6 = -7.321E-03, A_8 = 1.465E-03, A_{10} = -1.613E-04, A_{12} = 1.051E-05, A_{14} = 4.523E-07, A_{16} = -7.458E-08$
Seventh Surface $k = 0.000, A_4 = -4.107E-03, A_6 = -6.095E-04, A_8 = 2.313E-04, A_{10} = -1.564E-05, A_{12} = -1.063E-06, A_{14} = -4.057E-07, A_{16} = 1.971E-08$
Eighth Surface $k = 0.000, A_4 = -7.452E-03, A_6 = 2.441E-04, A_8 = 1.544E-04, A_{10} = -4.022E-05, A_{12} = -1.261E-07, A_{14} = 2.097E-07, A_{16} = 2.056E-08$
Ninth Surface $k = 0.000, A_4 = -1.153E-03, A_6 = 4.274E-04, A_8 = -1.137E-05, A_{10} = 5.141E-07, A_{12} = -1.679E-06, A_{14} = 6.825E-08, A_{16} = 2.075E-08$
Tenth Surface $k = 0.000, A_4 = -2.008E-03, A_6 = -5.326E-04, A_8 = -6.927E-05, A_{10} = 3.698E-06, A_{12} = -9.083E-07, A_{14} = -2.415E-08, A_{16} = 2.387E-09$
Eleventh Surface $k = 0.000, A_4 = -2.664E-03, A_6 = -4.928E-04, A_8 = 6.485E-06, A_{10} = -1.390E-06, A_{12} = 2.179E-08, A_{14} = 2.943E-09, A_{16} = 2.577E-11$
Twelfth Surface $k = 0.000, A_4 = -7.128E-03, A_6 = -1.704E-06, A_8 = -2.063E-06, A_{10} = 3.368E-07, A_{12} = 1.676E-08, A_{14} = 5.661E-10, A_{16} = -9.290E-11$
Thirteenth Surface $k = 0.000, A_4 = -7.959E-03, A_6 = 1.161E-04, A_8 = 1.846E-06, A_{10} = -1.411E-07, A_{12} = 2.493E-09, A_{14} = -4.883E-11, A_{16} = -1.244E-12$
Fourteenth Surface $k = 0.000, A_4 = -1.477E-02, A_6 = 4.361E-04, A_8 = 2.104E-07, A_{10} = 9.535E-08, A_{12} = -2.529E-09, A_{14} = -4.606E-10, A_{16} = 1.104E-11$ Fifteenth Surface $k = -5.017, A_4 = -8.878E-03, A_6 = 3.107E-04, A_8 = -7.809E-06, A_{10} = 1.765E-07, A_{12} = 8.693E-09, A_{14} = -5.836E-10, A_{16} = 8.814E-12$ f1 = 8.79 mm
f2 = −12.30 mm
f3 = 21.81 mm
f4 = 55.06 mm
f5 = 41.55 mm
f6 = −24.82 mm
f7 = −20.22 mm
f45 = 22.80 mm
f67 = −10.77 mm The values of the respective conditional expressions are as follows:

$f3/f1 = 2.48$ $f2/f3 = -0.56$ $f4/f = 4.78$ $f45/f = 1.98$ $f45/f67 = -2.12$ $D34/f = 0.08$ $D56/f = 0.19$ $f7/f = -1.76$ $f2/f1 = -1.40$ $f6/f7 = 1.23$

Accordingly, the imaging lens of Numerical Data Example 4 satisfies the above-described conditional expressions. The distance on the optical axis X from the object-side surface of the first lens L1 to the image plane IM (length without the filter 10) is 13.32 mm, and downsizing of the imaging lens is attained.

Figure 11:
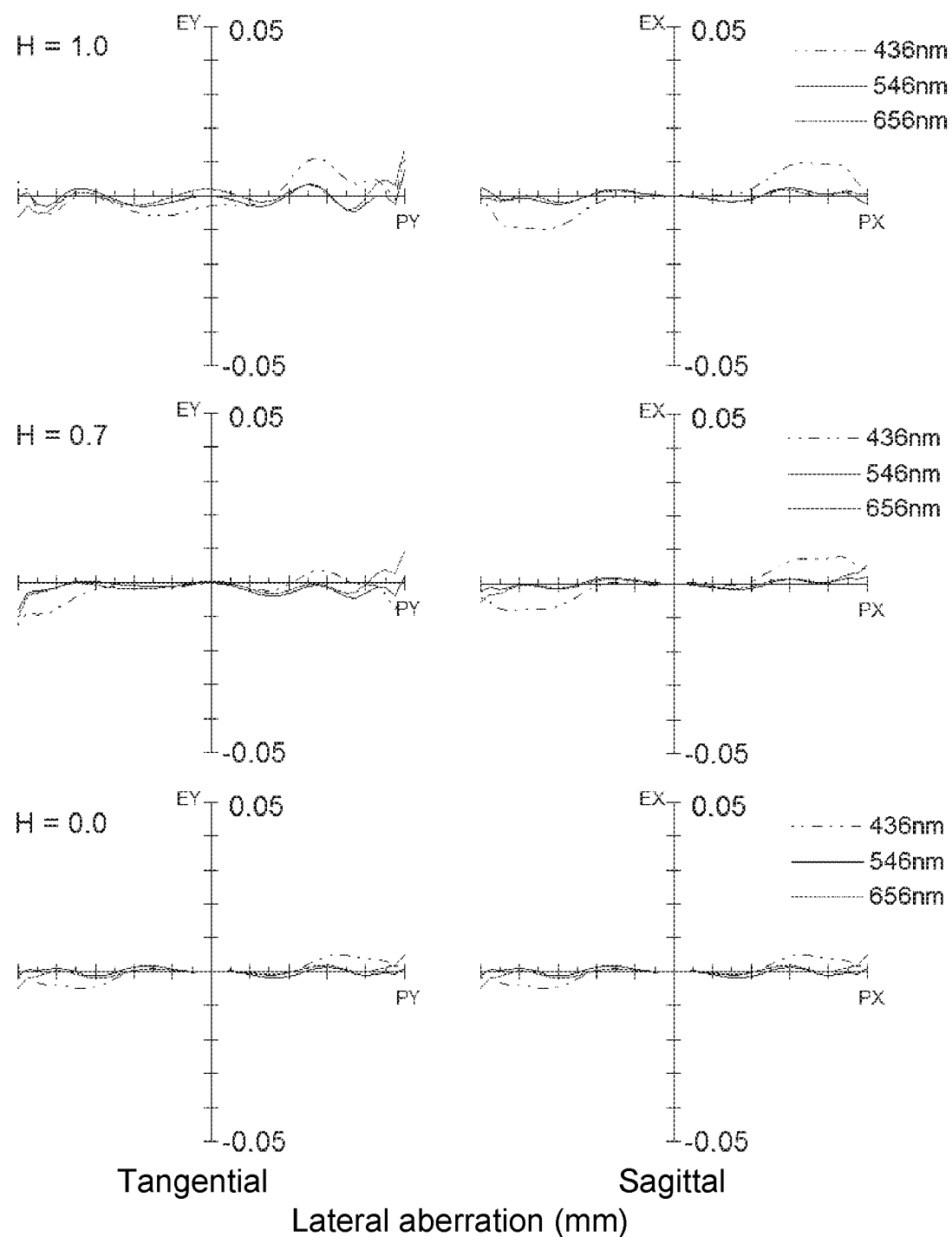
FIG. 11 is an aberration diagram showing a lateral aberration of the imaging lens of FIG. 10.
Figure 12:
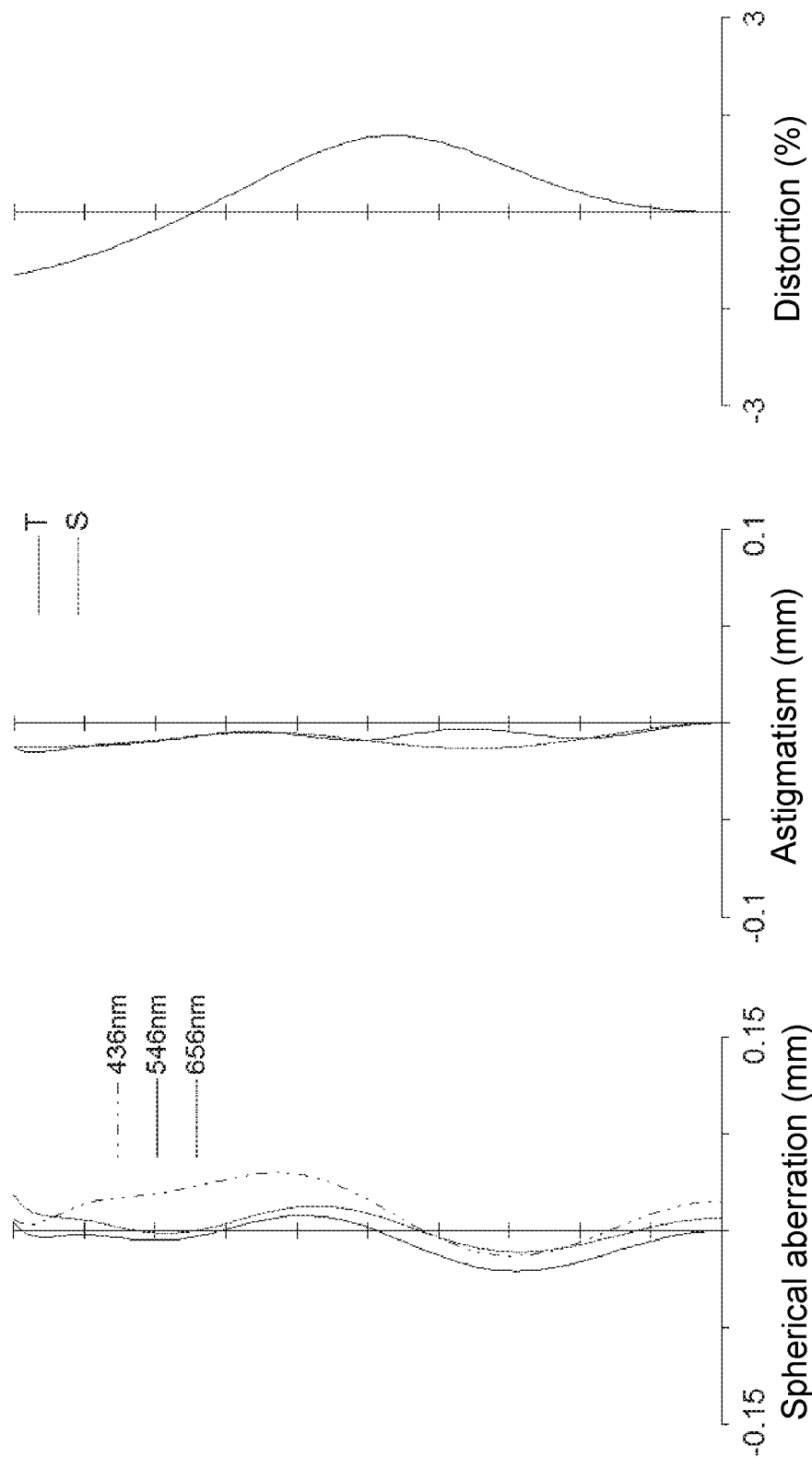
FIG. 12 is an aberration diagram showing a spherical aberration, astigmatism, and a distortion of the imaging lens of FIG. 10.
Figure 13:
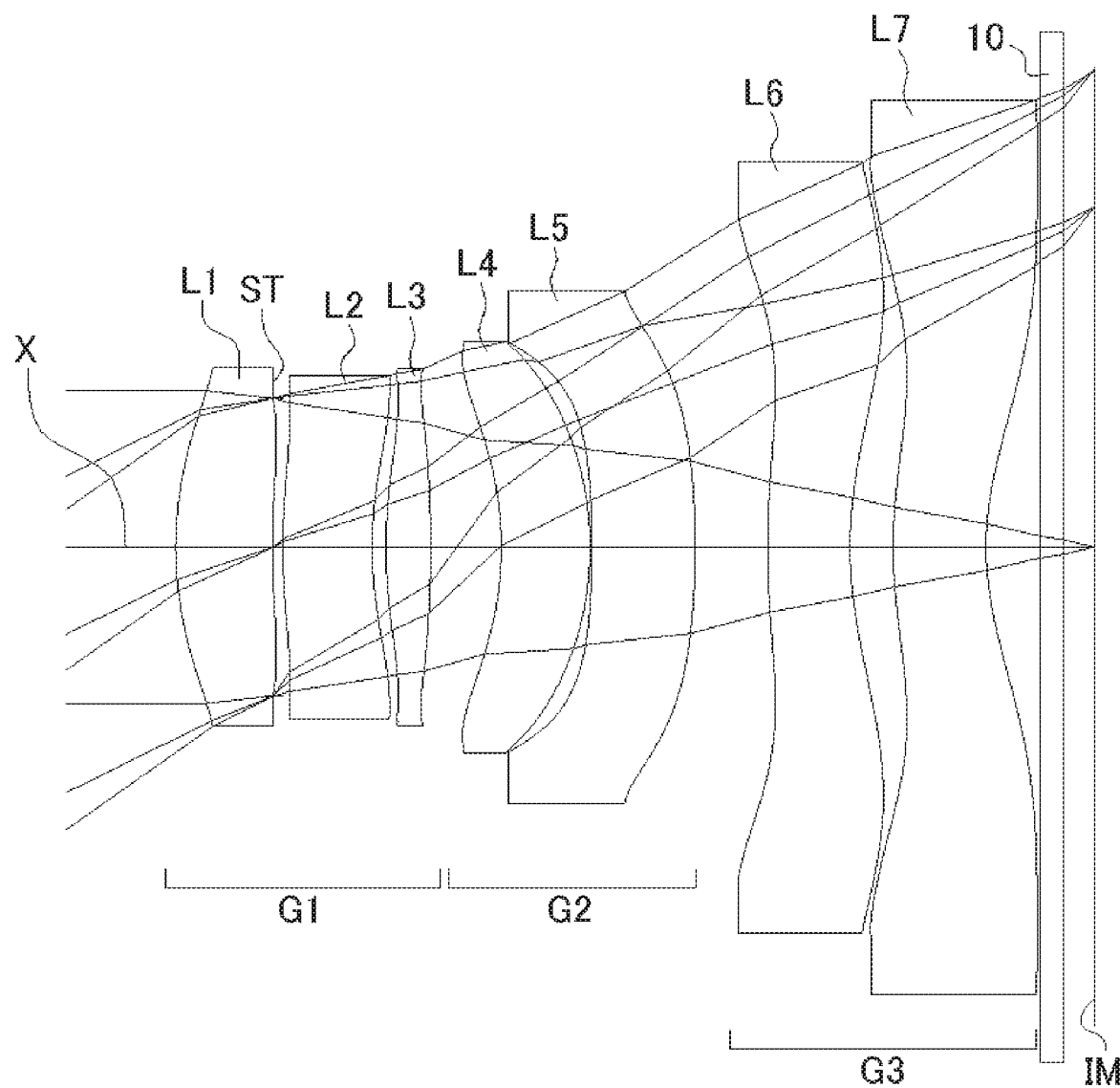
FIG. 13 shows a sectional view of a schematic configuration of an imaging lens in Numerical Data Example 5 according to the embodiment of the present invention.

FIG. 11 shows a lateral aberration that corresponds to the image height ratio H of the imaging lens, and FIG. 12 shows a spherical aberration (mm), astigmatism (mm), and a distortion (%), respectively, of the imaging lens of Numerical Data Example 4. As shown in FIGS. 11 and 12, according to the imaging lens of Numerical Data Example 4, the aberrations are also satisfactorily corrected.

Numerical Data Example 5

Basic data are shown below.
f=8.67 mm, Fno=2.2, ω=35.1°

Unit: mm

Surface Data

| Surface Number i | r | d | nd | vd |
|---|---|---|---|---|
| (Object) | ∞ | ∞ | | |
| 1* | 4.768 | 1.225 | 1.5346 | 56.1 (=vd1) |
| 2* | 13.787 | 0.006 | | |
| 3 (Stop) | ∞ | 0.121 | | |

-continued

Unit: mm

| | | | | |
|---|---|---|---|---|
| 4* | 9.112 | 1.131 | 1.6355 | 24.0 (=vd2) |
| 5* | 5.264 | 0.174 | | |
| 6* | 6.739 | 0.562 | 1.5346 | 56.1 (=vd3) |
| 7* | −18.422 | 0.894 (=D34) | | |
| 8* | −4.360 | 1.120 | 1.5346 | 56.1 (=vd4) |
| 9* | −4.203 | 0.023 | | |
| 10* | −13.261 | 1.306 | 1.6355 | 24.0 (=vd5) |
| 11* | −11.418 | 0.915 (=D56) | | |
| 12* | 9.779 | 1.044 | 1.6355 | 24.0 (=vd6) |
| 13* | 5.107 | 0.545 | | |
| 14* | 6.050 | 1.172 | 1.5346 | 56.1 (=vd7) |
| 15* | 3.667 | 0.680 | | |
| 16 | ∞ | 0.300 | 1.5168 | 64.2 |
| 17 | ∞ | 0.392 | | |
| (Image plane) | ∞ | | | |

Aspheric Surface Data

First Surface k = 0.000, $A_4$ = −1.442E−04, $A_6$ = −4.252E−04, $A_8$ = −5.829E−05, $A_{10}$ = 7.729E−06, $A_{12}$ = −7.729E−07, $A_{14}$ = −2.721E−07, $A_{16}$ = 2.173E−08

Second Surface k = 0.000, $A_4$ = 1.225E−02, $A_6$ = −1.770E−02, $A_8$ = 5.696E−03, $A_{10}$ = −8.952E−04, $A_{12}$ = 4.534E−05, $A_{14}$ = 5.387E−06, $A_{16}$ = −6.549E−07

Fourth Surface k = 0.000, $A_4$ = 1.248E−02, $A_6$ = −2.005E−02, $A_8$ = 7.570E−03, $A_{10}$ = −1.470E−03, $A_{12}$ = 1.137E−04, $A_{14}$ = 1.042E−05, $A_{16}$ = −1.989E−06

Fifth Surface k = 0.000, $A_4$ = 4.826E−03, $A_6$ = −1.017E−02, $A_8$ = 2.627E−03, $A_{10}$ = −3.251E−04, $A_{12}$ = 9.698E−06, $A_{14}$ = 1.282E−06, $A_{16}$ = −3.440E−08

Sixth Surface k = 0.000, $A_4$ = 3.529E−03, $A_6$ = −7.102E−03, $A_8$ = 1.423E−03, $A_{10}$ = −1.676E−04, $A_{12}$ = 1.021E−05, $A_{14}$ = 5.379E−07, $A_{16}$ = −5.165E−09

Seventh Surface k = 0.000, $A_4$ = −3.710E−03, $A_6$ = −2.157E−04, $A_8$ = 2.360E−04, $A_{10}$ = −5.668E−06, $A_{12}$ = 1.774E−07, $A_{14}$ = 1.109E−07, $A_{16}$ = 3.634E−08

Eighth Surface k = 0.000, $A_4$ = −3.150E−03, $A_6$ = 1.430E−03, $A_8$ = 1.997E−04, $A_{10}$ = −3.485E−05, $A_{12}$ = −3.109E−07, $A_{14}$ = 2.738E−07, $A_{16}$ = 1.097E−08

Ninth Surface k = 0.000, $A_4$ = −3.571E−03, $A_6$ = 2.703E−04, $A_8$ = −1.163E−05, $A_{10}$ = 1.381E−06, $A_{12}$ = −1.482E−06, $A_{14}$ = −2.457E−08, $A_{16}$ = 1.603E−08

Tenth Surface k = 0.000, $A_4$ = −7.473E−03, $A_6$ = −8.908E−04, $A_8$ = −1.243E−04, $A_{10}$ = 5.264E−06, $A_{12}$ = −5.447E−07, $A_{14}$ = −1.393E−07, $A_{16}$ = 2.669E−08

Eleventh Surface k = 0.000, $A_4$ = −3.477E−03, $A_6$ = −4.574E−04, $A_8$ = 1.270E−05, $A_{10}$ = 7.131E−08, $A_{12}$ = 1.551E−07, $A_{14}$ = 2.009E−08, $A_{16}$ = −1.129E−09

Twelfth Surface k = 0.000, $A_4$ = −7.052E−03, $A_6$ = 3.262E−05, $A_8$ = 4.109E−06, $A_{10}$ = 3.024E−07, $A_{12}$ = 2.279E−09, $A_{14}$ = −2.325E−10, $A_{16}$ = −1.801E−11

Thirteenth Surface k = 0.000, $A_4$ = −7.766E−03, $A_6$ = 1.105E−04, $A_8$ = −3.842E−07, $A_{10}$ = −9.066E−08, $A_{12}$ = 5.815E−09, $A_{14}$ = −4.823E−11, $A_{16}$ = −5.462E−12

Fourteenth Surface k = 0.000, $A_4$ = −1.216E−02, $A_6$ = 3.947E−04, $A_8$ = −1.379E−06, $A_{10}$ = 3.881E−08, $A_{12}$ = −3.941E−09, $A_{14}$ = −4.418E−10, $A_{16}$ = 1.538E−11

Fifteenth Surface k = −3.754, $A_4$ = −6.588E−03, $A_6$ = 3.515E−04, $A_8$ = −1.117E−05, $A_{10}$ = 1.138E−07, $A_{12}$ = 1.115E−08, $A_{14}$ = −5.171E−10, $A_{16}$ = 6.563E−12 f1 = 13.02 mm
f2 = −22.14 mm
f3 = 9.30 mm
f4 = 62.66 mm
f5 = 101.37 mm
f6 = −18.42 mm
f7 = −21.01 mm
f45 = 38.47 mm
f67 = −9.32 mm

The values of the respective conditional expressions are as follows:

$f3/f1$=0.71

$f2/f3$=−2.38

$f4/f$=7.23

$f45/f$=4.44

$f45/f67$=−4.13

$D34/f$=0.10

$D56/f$=0.11

$f7/f$=−2.42

$f2/f1$=−1.70

$f6/f7$=0.88

Accordingly, the imaging lens of Numerical Data Example 5 satisfies the above-described conditional expressions. The distance on the optical axis X from the object-side surface of the first lens L1 to the image plane IM (length without the filter 10) is 11.51 mm, and downsizing of the imaging lens is attained.

Figure 14:
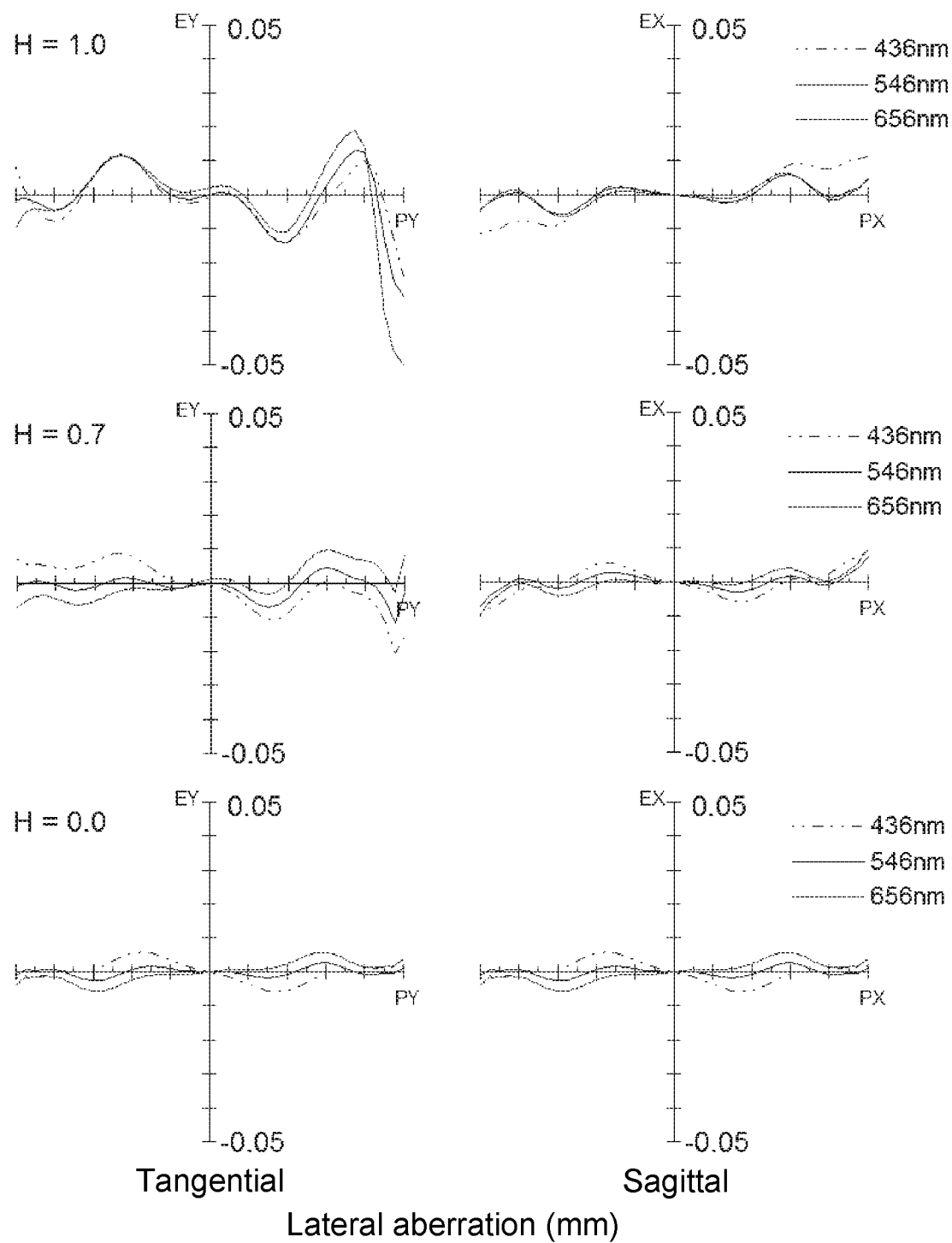
FIG. 14 is an aberration diagram showing a lateral aberration of the imaging lens of FIG. 13.
Figure 15:
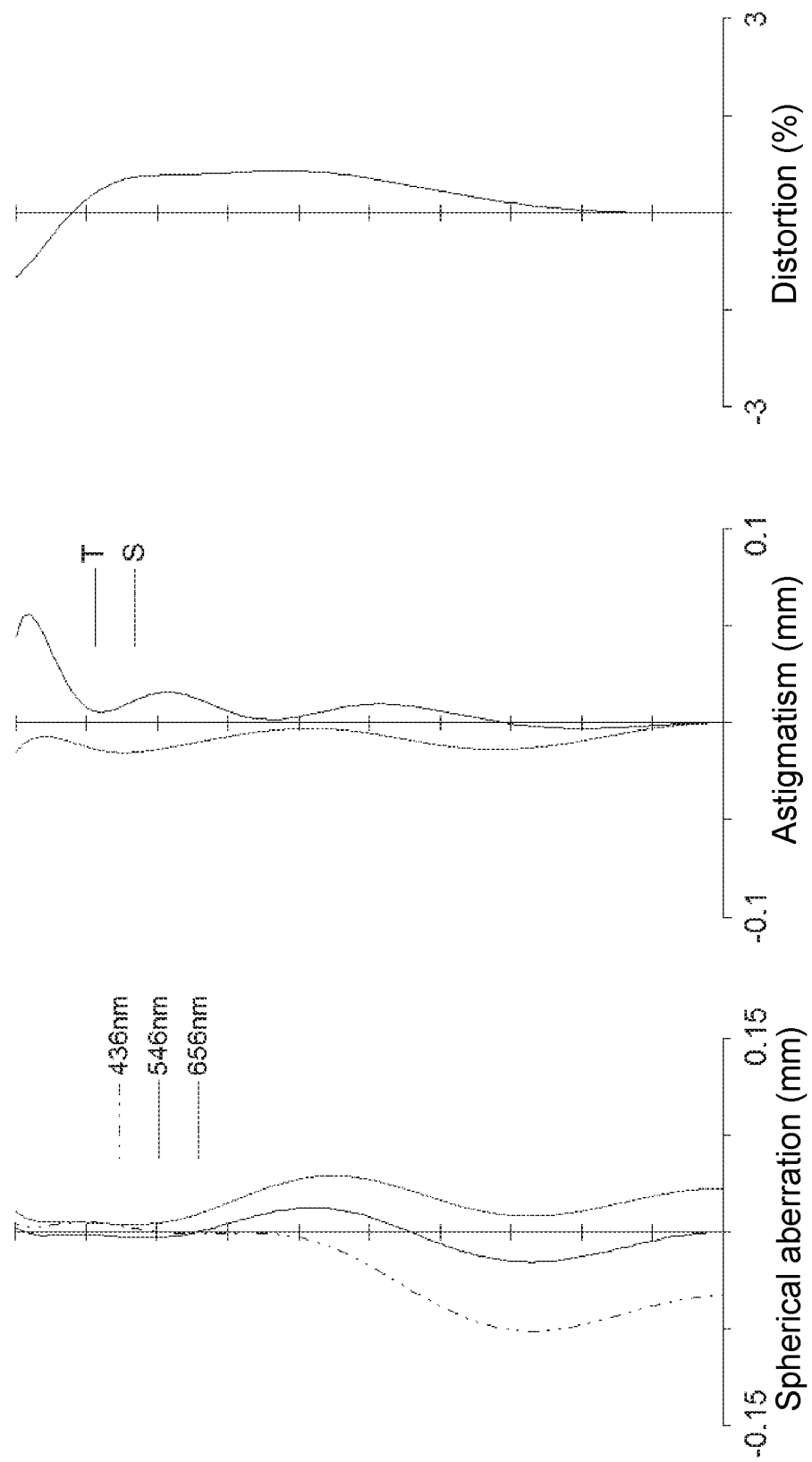
FIG. 15 is an aberration diagram showing a spherical aberration, astigmatism, and a distortion of the imaging lens of FIG. 13.
Figure 16:
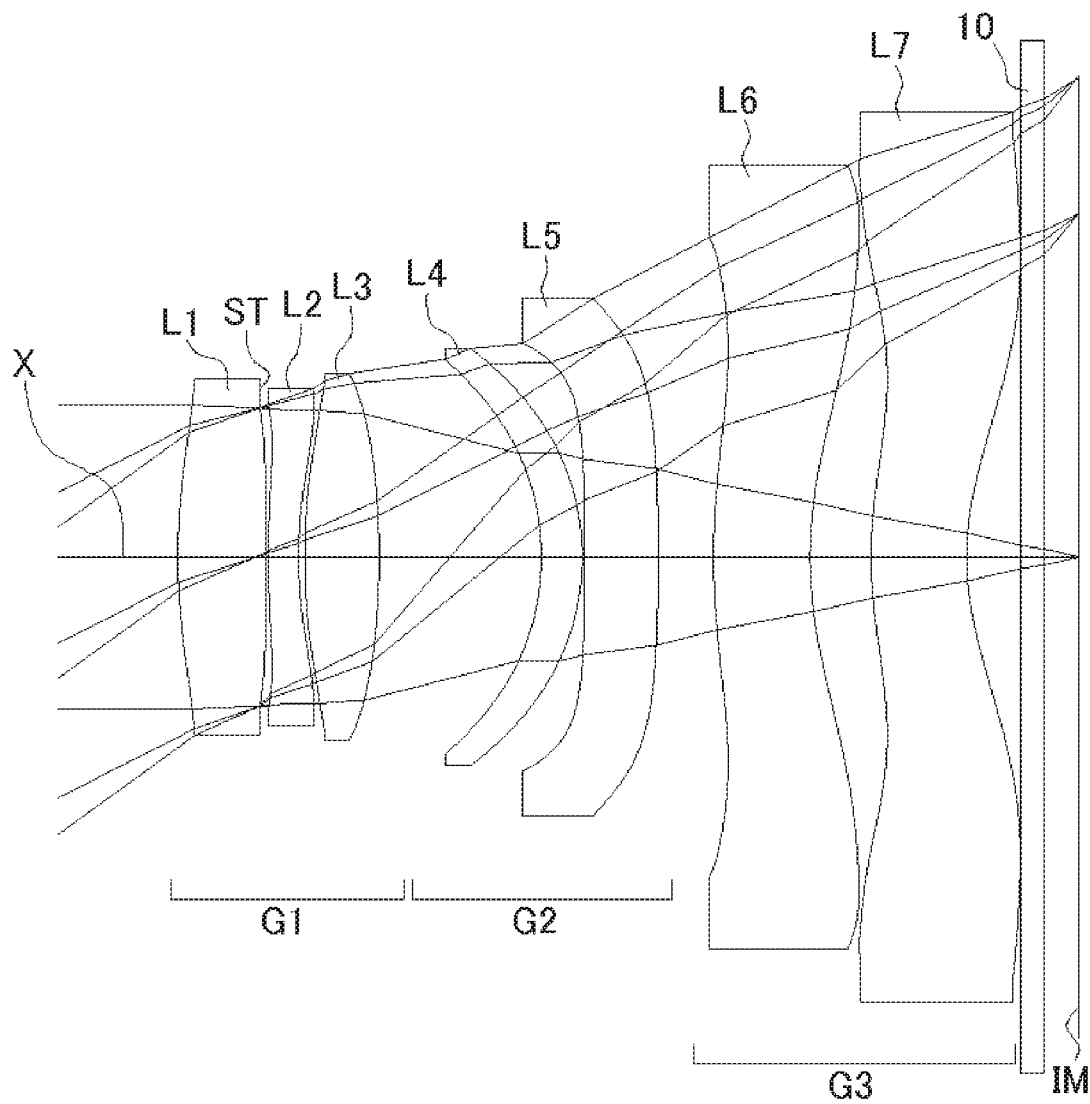
FIG. 16 shows a sectional view of a schematic configuration of an imaging lens in Numerical Data Example 6 according to the embodiment of the present invention.

FIG. 14 shows a lateral aberration that corresponds to the image height ratio H of the imaging lens, and FIG. 15 shows a spherical aberration (mm), astigmatism (mm), and a distortion (%), respectively, of the imaging lens of Numerical Data Example 5. As shown in FIGS. 14 and 15, according to the imaging lens of Numerical Data Example 5, the aberrations are also satisfactorily corrected.

Numerical Data Example 6

Basic data are shown below.
f=8.40 mm, Fno=2.2, ω=36.0°

Unit: mm

Surface Data

| Surface Number i | r | d | nd | vd |
|---|---|---|---|---|
| (Object) | ∞ | ∞ | | |
| 1* | 7.658 | 1.100 | 1.5346 | 56.1 (=vd1) |
| 2* | −53.073 | −0.069 | | |
| 3 (Stop) | ∞ | 0.106 | | |

-continued

Unit: mm

| | | | | |
|---|---|---|---|---|
| 4* | 16.879 | 0.380 | 1.6355 | 24.0 (=vd2) |
| 5* | 6.417 | 0.076 | | |
| 6* | 9.768 | 0.933 | 1.5346 | 56.1 (=vd3) |
| 7* | −10.747 | 2.035 (=D34) | | |
| 8* | −3.282 | 0.515 | 1.5346 | 56.1 (=vd4) |
| 9* | −3.135 | 0.030 | | |
| 10* | −49.303 | 0.923 | 1.6355 | 24.0 (=vd5) |
| 11* | −27.983 | 0.694 (=D56) | | |
| 12* | 8.841 | 1.211 | 1.6355 | 24.0 (=vd6) |
| 13* | 5.141 | 0.767 | | |
| 14* | 5.521 | 1.198 | 1.5346 | 56.1 (=vd7) |
| 15* | 3.529 | 0.680 | | |
| 16 | ∞ | 0.300 | 1.5168 | 64.2 |
| 17 (Image plane) | ∞ | 0.418 | | |

Aspheric Surface Data

First Surface $k = 0.000$, $A_4 = -4.156E-03$, $A_6 = -5.223E-05$, $A_8 = -5.968E-05$, $A_{10} = 1.006E-05$, $A_{12} = 6.018E-08$, $A_{14} = -3.837E-08$, $A_{16} = -6.205E-09$ Second Surface $k = 0.000$, $A_4 = 1.712E-02$, $A_6 = -1.648E-02$, $A_8 = 5.700E-03$, $A_{10} = -9.584E-04$, $A_{12} = 3.864E-05$, $A_{14} = 9.170E-06$, $A_{16} = -9.202E-07$ Fourth Surface $k = 0.000$, $A_4 = 1.915E-02$, $A_6 = -2.128E-02$, $A_8 = 7.442E-03$, $A_{10} = -1.369E-03$, $A_{12} = 7.994E-05$, $A_{14} = 1.026E-05$, $A_{16} = -1.252E-06$ Fifth Surface $k = 0.000$, $A_4 = 1.316E-02$, $A_6 = -1.210E-02$, $A_8 = 2.743E-03$, $A_{10} = -3.303E-04$, $A_{12} = 1.025E-05$, $A_{14} = 1.712E-06$, $A_{16} = 1.496E-08$ Sixth Surface $k = 0.000$, $A_4 = 1.443E-02$, $A_6 = -7.325E-03$, $A_8 = 1.468E-03$, $A_{10} = -1.653E-04$, $A_{12} = 9.429E-06$, $A_{14} = 3.314E-07$, $A_{16} = -5.385E-08$ Seventh Surface $k = 0.000$, $A_4 = -2.920E-03$, $A_6 = -6.142E-04$, $A_8 = 2.006E-04$, $A_{10} = -1.681E-05$, $A_{12} = -5.885E-07$, $A_{14} = -3.186E-07$, $A_{16} = 1.411E-08$ Eighth Surface $k = 0.000$, $A_4 = -5.868E-03$, $A_6 = 4.981E-04$, $A_8 = 1.644E-04$, $A_{10} = -3.745E-05$, $A_{12} = 3.196E-07$, $A_{14} = 2.464E-07$, $A_{16} = 1.890E-08$ Ninth Surface $k = 0.000$, $A_4 = -2.778E-03$, $A_6 = 5.034E-04$, $A_8 = -1.365E-06$, $A_{10} = 3.204E-07$, $A_{12} = -1.817E-06$, $A_{14} = 6.919E-08$, $A_{16} = 2.640E-08$ Tenth Surface $k = 0.000$, $A_4 = -2.145E-03$, $A_6 = -7.136E-04$, $A_8 = -7.507E-05$, $A_{10} = 4.838E-06$, $A_{12} = -8.803E-07$, $A_{14} = -5.411E-08$, $A_{16} = -3.818E-09$ Eleventh Surface $k = 0.000$, $A_4 = -1.111E-03$, $A_6 = -4.709E-04$, $A_8 = 1.734E-06$, $A_{10} = -1.459E-06$, $A_{12} = 5.712E-08$, $A_{14} = 7.257E-09$, $A_{16} = 2.782E-10$ Twelfth Surface $k = 0.000$, $A_4 = -4.802E-03$, $A_6 = 2.466E-05$, $A_8 = -1.921E-07$, $A_{10} = 1.754E-07$, $A_{12} = 5.647E-09$, $A_{14} = 6.112E-10$, $A_{16} = -6.960E-11$ Thirteenth Surface $k = 0.000$, $A_4 = -6.235E-03$, $A_6 = 6.105E-05$, $A_8 = 2.172E-06$, $A_{10} = -1.096E-07$, $A_{12} = 3.182E-09$, $A_{14} = -5.783E-11$, $A_{16} = -4.904E-12$ Fourteenth Surface $k = 0.000$, $A_4 = -1.286E-02$, $A_6 = 4.059E-04$, $A_8 = -7.829E-07$, $A_{10} = 4.146E-08$, $A_{12} = -4.337E-09$, $A_{14} = -4.785E-10$, $A_{16} = 1.473E-11$ -continued Unit: mm Fifteenth Surface $k = -3.781$, $A_4 = -5.334E-03$, $A_6 = 2.322E-04$, $A_8 = -9.022E-06$, $A_{10} = 1.882E-07$, $A_{12} = 9.396E-09$, $A_{14} = -5.765E-10$, $A_{16} = 8.140E-12$ f1 = 12.60 mm
f2 = −16.52 mm
f3 = 9.73 mm
f4 = 59.00 mm
f5 = 100.14 mm
f6 = −22.14 mm
f7 = −23.14 mm
f45 = 36.69 mm
f67 = −10.76 mm The values of the respective conditional expressions are as follows:

$f3/f1=0.77$ $f2/f3=-1.70$ $f4/f=7.02$ $f45/f=4.37$ $f45/f67=-3.41$ $D34/f=0.24$ $D56/f=0.08$ $f7/f=-2.75$ $f2/f1=-1.31$ $f6/f7=0.96$

Accordingly, the imaging lens of Numerical Data Example 6 satisfies the above-described conditional expressions. The distance on the optical axis X from the object-side surface of the first lens L1 to the image plane IM (length without the filter 10) is 11.19 mm, and downsizing of the imaging lens is attained.

Figure 17:
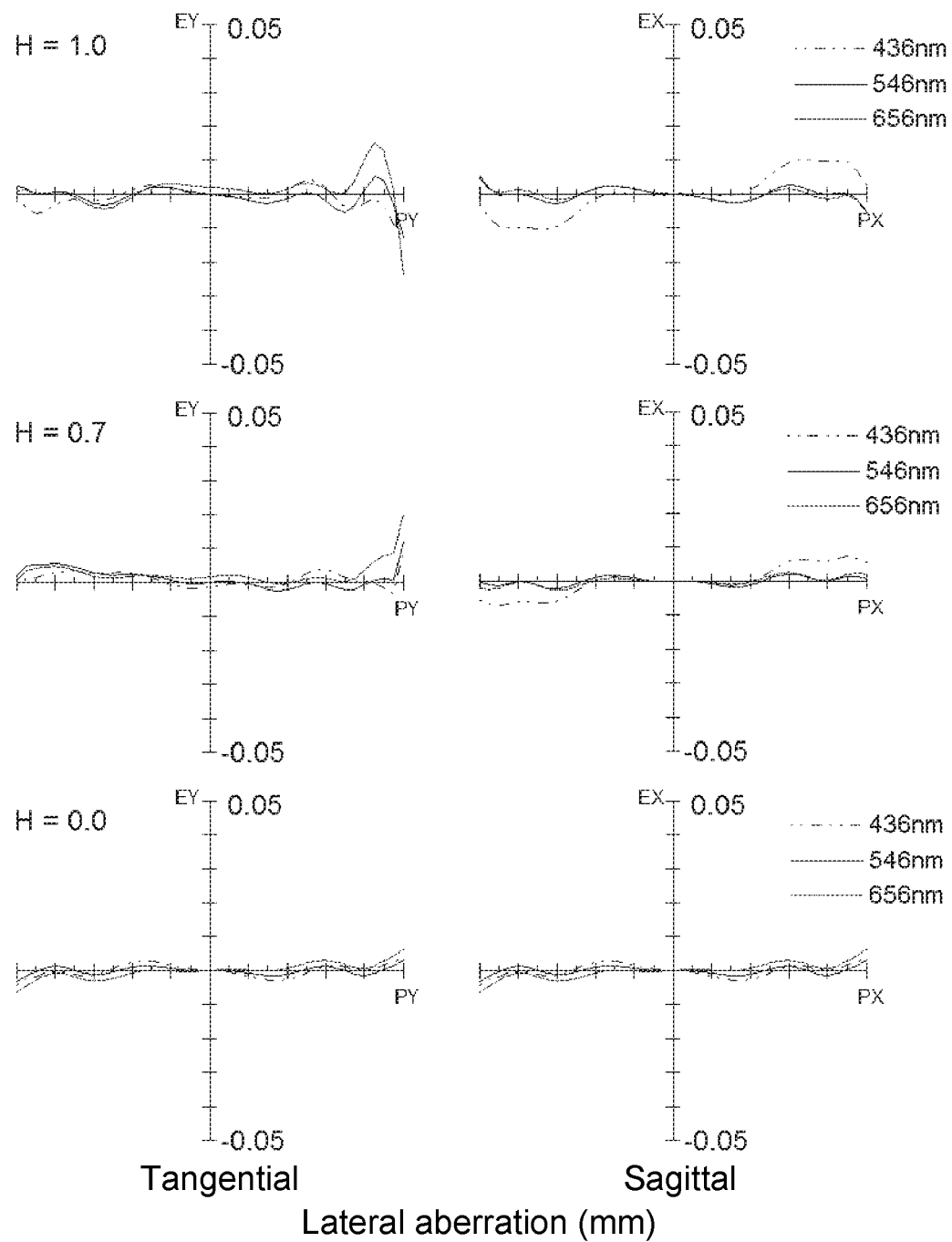
FIG. 17 is an aberration diagram showing a lateral aberration of the imaging lens of FIG. 16.
Figure 18:
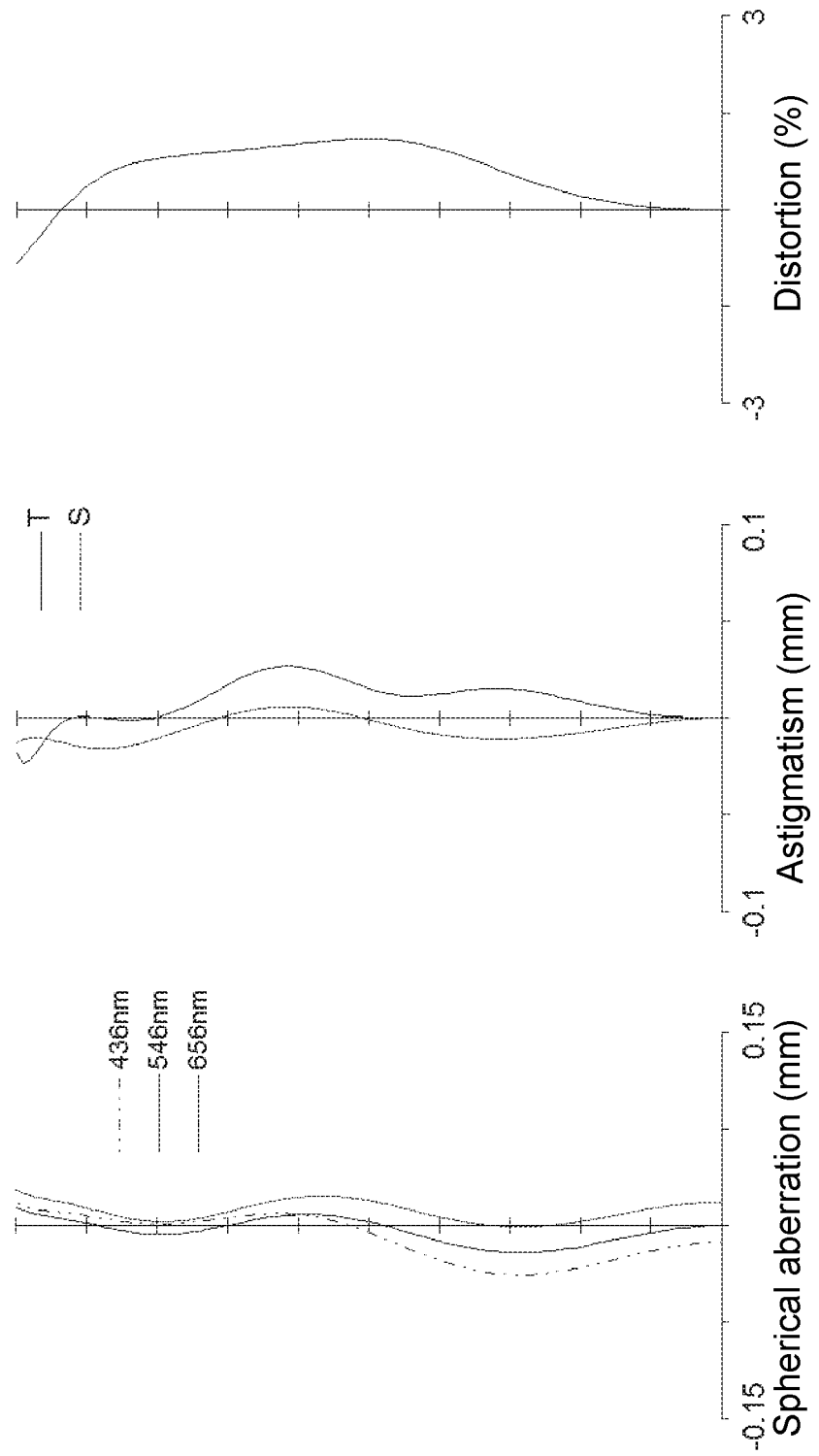
FIG. 18 is an aberration diagram showing a spherical aberration, astigmatism, and a distortion of the imaging lens of FIG. 16.

FIG. 17 shows a lateral aberration that corresponds to the image height ratio H of the imaging lens, and FIG. 18 shows a spherical aberration (mm), astigmatism (mm), and a distortion (%), respectively, of the imaging lens of Numerical Data Example 6. As shown in FIGS. 17 and 18, according to the imaging lens of Numerical Data Example 6, the aberrations are also satisfactorily corrected.

According to the imaging lens of the embodiment described above, it is achievable to have a wide angle of view (2ω) of 70° or greater. According to Numerical Data Examples 1 to 6, the imaging lenses have wide angles of view of 54.2° to 72.0°.

According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high resolution imaging lens. In case of such an imaging element with a high pixel count, a light-receiving area of each pixel decreases, so that an image taken tends to be dark. As a method for correcting this problem, there is a method of enhancing light-receiving sensitivity of the imaging element using an electrical circuit. However, when the light-receiving sensitivity increases, a noise component that does not directly contribute to image formation is also amplified, so that it is necessary to use another circuit for reducing the noise. According to the imaging lenses of Numerical Data Examples 1 to 6, the Fnos are as small as 2.2 to 2.9. According to the imaging lens of the embodiment, it is possible to obtain a sufficiently bright image without the above-described electrical circuit.

Accordingly, when the imaging lens of the embodiment or the imaging device equipped with the imaging lens is mounted in cellular phones, smartphones, digital still cameras, portable information terminals, security cameras, onboard cameras, and network cameras, it is possible to attain both high performance and downsizing of the cameras.

The present invention is applicable in an imaging lens to be mounted in a relatively small camera for portable devices including cellular phones, smartphones, and portable information terminals, digital still cameras, security cameras, onboard cameras, and network cameras.

The disclosure of Japanese Patent Application No. 2014-038093, filed on Feb. 28, 2014, is incorporated in the application by reference.

While the present invention has been explained with reference to the specific embodiment of the present invention, the explanation is illustrative and the present invention is limited only by the appended claims.

What is claimed is:

1. An imaging lens comprising:
   a first lens having at least one aspheric surface and positive refractive power;
   a second lens having at least one aspheric surface;
   a third lens having at least one aspheric surface;
   a fourth lens having at least one aspheric surface;
   a fifth lens having at least one aspheric surface;
   a sixth lens having two aspheric surfaces; and
   a seventh lens having two aspheric surfaces and negative refractive power, arranged in this order from an object side to an image plane side respectively with a space in between,
   wherein said imaging lens has a total of seven lenses, and
   said fifth lens is disposed away from the sixth lens by a distance D56 on an optical axis and said second lens has an Abbe's number vd2 so that the following conditional expressions are satisfied:

$0.08 \leq D56/f < 0.25$, $20 < vd2 < 35$, where f is a focal length of a whole lens system.

2. The imaging lens according to claim 1, further comprising an aperture stop disposed between the first lens and the second lens.

3. The imaging lens according to claim 1, wherein said first lens has a focal length f1 and said third lens has a focal length f3 so that the following conditional expression is satisfied:

$0.3 < f3/f1 < 3.0$.

4. The imaging lens according to claim 1, wherein said second lens has a focal length f2 and said third lens has a focal length f3 so that the following conditional expression is satisfied:

$-3.0 < f2/f3 < -0.3$.

5. The imaging lens according to claim 1, wherein said fourth lens has a focal length f4 so that the following conditional expression is satisfied:

$4.5 < f4/f < 9.0$.

6. The imaging lens according to claim 1, wherein said third lens is disposed away from the fourth lens by a distance D34 on an optical axis so that the following conditional expression is satisfied:

$0.05 < D34/f < 0.3$.

7. The imaging lens according to claim 1, wherein said seventh lens has a focal length f7 so that the following conditional expression is satisfied:

$-4.0 < f7/f < -1.0$.

8. An imaging lens comprising:
   a first lens having at least one aspheric surface;
   a second lens having at least one aspheric surface;
   a third lens having at least one aspheric surface;
   a fourth lens having at least one aspheric surface;
   a fifth lens having at least one aspheric surface;
   a sixth lens having two aspheric surfaces; and
   a seventh lens having two aspheric surfaces, arranged in this order from an object side to an image plane side respectively with a space in between,
   wherein said imaging lens has a total of seven lenses,
   said first lens is formed in a shape so that a surface thereof on the object side is convex near an optical axis thereof,
   said seventh lens is formed in a shape so that a surface thereof on the image plane side is concave near an optical axis thereof, and
   said fifth lens is disposed away from the sixth lens by a distance D56 on an optical axis and said second lens has an Abbe's number vd2 so that the following conditional expressions are satisfied:

$0.08 \leq D56/f < 0.25$, $20 < vd2 < 35$, where f is a focal length of a whole lens system.

9. The imaging lens according to claim 8, further comprising an aperture stop disposed between the first lens and the second lens.

10. The imaging lens according to claim 8, wherein said first lens has a focal length f1 and said third lens has a focal length f3 so that the following conditional expression is satisfied:

$0.3 < f3/f1 < 3.0$.

11. The imaging lens according to claim 8, wherein said second lens has a focal length f2 and said third lens has a focal length f3 so that the following conditional expression is satisfied:

$-3.0 < f2/f3 < -0.3$.

12. The imaging lens according to claim 8, wherein said fourth lens has a focal length f4 so that the following conditional expression is satisfied:

$4.5 < f4/f < 9.0$.

13. The imaging lens according to claim 8, wherein said third lens is disposed away from the fourth lens by a distance D34 on an optical axis so that the following conditional expression is satisfied:

$0.05 < D34/f < 0.3$.

14. The imaging lens according to claim 8, wherein said seventh lens has a focal length f7 so that the following conditional expression is satisfied:

$-4.0 < f7/f < -1.0$.

15. An imaging lens comprising:
a first lens having at least one aspheric surface and positive refractive power;
an aperture stop;
a second lens having at least one aspheric surface;
a third lens having at least one aspheric surface;
a fourth lens having at least one aspheric surface;
a fifth lens having at least one aspheric surface;
a sixth lens having two aspheric surfaces; and
a seventh lens having two aspheric surfaces, arranged in this order from an object side to an image plane side respectively with a space in between,
wherein said imaging lens has a total of seven lenses,
said first lens is formed in a shape so that a surface thereof on the object side is convex near an optical axis thereof,
said fourth lens is formed in a meniscus shape near an optical axis thereof,
said seventh lens is formed in a shape so that a surface thereof on the image plane side is concave near an optical axis thereof, and
said third lens is disposed away from the fourth lens by a distance D34 on an optical axis and said second lens has an Abbe's number vd2 so that the following conditional expressions are satisfied:

$0.05 < D34/f < 0.3$, $20 < vd2 < 35$, where f is a focal length of a whole lens system.

16. The imaging lens according to claim 15, wherein said first lens has a focal length f1 and said third lens has a focal length f3 so that the following conditional expression is satisfied:

$0.3 < f3/f1 < 3.0$.

17. The imaging lens according to claim 15, wherein said second lens has a focal length f2 and said third lens has a focal length f3 so that the following conditional expression is satisfied:

$-3.0 < f2/f3 < -0.3$.

18. The imaging lens according to claim 15, wherein said fourth lens has a focal length f4 so that the following conditional expression is satisfied:

$4.5 < f4/f < 9.0$.

19. The imaging lens according to claim 15, wherein said fifth lens is disposed away from the sixth lens by a distance D56 on an optical axis so that the following conditional expression is satisfied:

$0.05 < D56/f < 0.25$.

20. The imaging lens according to claim 15, wherein said seventh lens has a focal length f7 so that the following conditional expression is satisfied:

$-4.0 < f7/f < -1.0$.

* * * * *